United States Patent
Nayar et al.

(10) Patent No.: US 7,663,640 B2
(45) Date of Patent: Feb. 16, 2010

(54) METHODS AND SYSTEMS FOR COMPENSATING AN IMAGE PROJECTED ONTO A SURFACE HAVING SPATIALLY VARYING PHOTOMETRIC PROPERTIES

(75) Inventors: Shree Nayar, New York, NY (US); Michael Grossberg, New York, NY (US); Harish Peri, New York, NY (US); Peter Belhumeur, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 10/883,861

(22) Filed: Jul. 2, 2004

(65) Prior Publication Data

US 2005/0134599 A1 Jun. 23, 2005

Related U.S. Application Data

(60) Provisional application No. 60/484,252, filed on Jul. 2, 2003.

(51) Int. Cl.
*G09G 5/02* (2006.01)
(52) U.S. Cl. .................. 345/589; 345/590; 345/591; 345/597
(58) Field of Classification Search ......... 345/589–591, 345/597; 348/191
See application file for complete search history.

(56) References Cited

U.S. PATENT DOCUMENTS

| 3,027,421 A | 3/1962 | Heijligers |
| 3,096,399 A | 7/1963 | Thomas |
| 3,147,341 A | 9/1964 | Gibson |
| 3,165,582 A | 1/1965 | Korda |
| 3,200,193 A | 8/1965 | Biggs et al. |
| 3,404,226 A | 10/1968 | Szeremy et al. |
| 3,649,755 A | 3/1972 | Newman |
| 4,090,216 A | 5/1978 | Constable |

(Continued)

FOREIGN PATENT DOCUMENTS

JP 11-041615 2/1999

OTHER PUBLICATIONS

Cruz-Neira, Carolina et al. "Surround-Screen Projection-Based Virtual Reality: The Design and Implementation of the CAVE." Comupter Grahics Annual Conference Series, pp. 135-142 (1993).

(Continued)

*Primary Examiner*—Hau H Nguyen
(74) *Attorney, Agent, or Firm*—Byrne Poh LLP

(57) ABSTRACT

Methods and systems are provided for displaying images onto an arbitrary surface, using a projector, such that the quality of the images is preserved despite surface imperfections or color variations. Methods and systems are also provided for controlling the appearance of a projection surface. Various embodiments use a detailed radiometric model and a calibration method to determine the pixel values required to be projected by a projector in order for a camera to observe a desired image. Other embodiments use a compensation algorithm that uses a feedback approach to provide the desired image compensation. Geometric mapping may be used to establish a correspondence between points in the images to be displayed by the projector and the corresponding points in the images that are captured by the camera.

27 Claims, 14 Drawing Sheets

U.S. PATENT DOCUMENTS

| | | | |
|---|---|---|---|
| 4,355,334 | A | 10/1982 | Fitzgibbon et al. |
| 4,514,727 | A | 4/1985 | Van Antwerp |
| 4,589,022 | A | 5/1986 | Prince et al. |
| 4,952,917 | A | 8/1990 | Yabuuchi |
| 4,974,073 | A | 11/1990 | Inova |
| 5,057,744 | A | 10/1991 | Barbier et al. |
| 5,083,195 | A | 1/1992 | Evelin |
| 5,222,203 | A | 6/1993 | Obata |
| 5,270,818 | A | 12/1993 | Ottenstein |
| 5,442,484 | A | 8/1995 | Shikawa |
| 5,475,447 | A * | 12/1995 | Funado ............ 348/745 |
| 5,734,439 | A | 3/1998 | Wirbitzki et al. |
| 5,818,553 | A | 10/1998 | Koenck et al. |
| 5,854,661 | A | 12/1998 | Kochanski |
| 6,040,835 | A | 3/2000 | Gibson |
| 6,310,650 | B1 * | 10/2001 | Johnson et al. ........ 348/383 |
| 6,396,495 | B1 | 5/2002 | Parghi et al. |
| 6,452,593 | B1 | 9/2002 | Challener |
| 6,459,818 | B1 | 10/2002 | George |
| 6,559,826 | B1 | 5/2003 | Mendelson et al. |
| 6,611,249 | B1 | 8/2003 | Evanicky et al. |
| 6,639,595 | B1 | 10/2003 | Drebin et al. |
| 6,803,928 | B2 | 10/2004 | Bimber et al. |
| 6,804,406 | B1 * | 10/2004 | Chen ............ 348/745 |
| 6,836,298 | B2 * | 12/2004 | Song et al. ........ 348/745 |
| 6,842,175 | B1 | 1/2005 | Schmalstieg et al. |
| 6,867,751 | B1 | 3/2005 | Meldrum |
| 6,950,109 | B2 * | 9/2005 | Deering ............ 345/589 |
| 7,019,713 | B2 * | 3/2006 | Hereld et al. ........ 345/1.1 |
| 7,038,727 | B2 * | 5/2006 | Majumder et al. ...... 348/745 |
| 7,133,083 | B2 * | 11/2006 | Jaynes et al. ........ 348/745 |
| 2001/0040574 | A1 | 11/2001 | Prater |
| 2002/0080136 | A1 | 6/2002 | Kouadio |
| 2002/0122044 | A1 | 9/2002 | Deering |
| 2002/0171637 | A1 | 11/2002 | Kadowaki et al. |
| 2003/0107805 | A1 | 6/2003 | Street |
| 2004/0135744 | A1 | 7/2004 | Bimber et al. |
| 2004/0201586 | A1 | 10/2004 | Marschner et al. |

OTHER PUBLICATIONS

Debevec, Paul E. and Jitendra Malik. "Recovering High Dynamic Range Radiance Maps from Photographs." SIGGRAPH Conference Proceedings, pp. 369-378, (Aug. 1997).

Evans, K. Franklin. "The Spherical Harmonics Discrete Ordinate Method for Three-Dimensional Atmospheric Radiative Transfer." Journal of the Atmospheric Sciences, vol. 55, pp. 429-446. (Feb. 1998).

Holmes, Richard E. "Common Projector and Display Modules for Aircraft Simulator Visual Systems." IMAGE V Conference, pp. 81-88. (Jun. 1990).

Humphreys, Greg and Pat Hanrahan. "A distributed graphics system for large tiled displays." Proceedings of IEEE Visualization, pp. 215-223. (1999).

Inami, Masahiko et al. "Visuo-Haptic Display Using Head-Mounted Projector." Proc. of the IEEE VR, pp. 233-240. (2000).

International Search Report from PCT Application No. PCT/US04/21400. (Nov. 29, 2006).

Jaynes, Christopher et al. "A Scalable Framework for High-Resolution Immersive Displays." IETO Journal of Research, 48(3 & 4):273-280. (2002).

Li, Kai and Yuqun Chen. "Optical Blending for Multi-projector Display Wall Systems." IEEE Proc. 12th Laser and Electro-Optics Society, vol. 1, pp. 281-282. (1999).

Majumder, Aditi and Rick Stevens. "LAM: Luminance Attenuation Map for Photometric Uniformity in Projection Based Displays." ACM Virtual Reality and Software Technology, pp. 147-154. (2002).

Majumder, Aditi et al. "Achieving Color Uniformity Across Multi-Projector Displays." Proc. IEEE Visualization, pp. 117-124. (2000).

Mann, S. and R. W. Picard. "On Being 'Undigital' with Digital Cameras: Extending Dynamic Range by Combining Differently Exposed Pictures." Proc. of IST's 48th Annual Conference, pp. 442-448. (May 1995).

Mitsunaga, Tomoo and Shree K. Nayar. "Radiometric Self Calibration." Proc. of Computer Vision and Pattern Recognition, vol. 1, pp. 374-380. (Jun. 1999).

Nishi, Takahiro et al. "SnapLink: Interactive Object Registration and Recognition for Augmented Desk Interface." Proc. 2001 IFIP Conference on Human-Computer Interaction, pp. 240-246. (2001).

Raskar, Ramesh et al. "Cartoon Dioramas in Motion." International Symposium on Non-Photorealistic Animation and Rendering, pp. 7-12. (2002).

Raskar, Ramesh et al. "Multi-Projector Displays Using Camera-Based Registration." Proc. IEEE Visualization, pp. 161-168. (Oct. 1999).

Raskar, Ramesh et al. "Seamless Projection Overlaps using Image Warping and Intensity Blending." 4th Annual International Conference on Virtual Systems and Multimedia. (Nov. 1998).

Raskar, Ramesh et al. "Shader Lamps: Animating Real Objects with Image-Based Illumination." Europgrahics Workshop on Rendering, University of North Carolina. (2001).

Raskar, Ramesh et al. "The Office of the Future: A Unified Approach to Image-Based Modeling and Spatially Immersive Displays." Computer Graphics Proceedings, Annual Conference Series, pp. 179-188. (1998).

Raskar, Ramesh and Paul Beardsley. "A Self-Correcting Projector." IEEE Computer Vision and Pattern Recognition, vol. 2, pp. 504-508. (2002).

Stone, Maureen C. "Color and Brightness Appearance Issues in Tiled Displays." Computer and Graphics Applications, 21(6):58-67. (Sep. 2001).

Stone, Maureen C. "Color Balancing Experimental Projection Displays." Proc. of the 9th Color Imaging Conference, pp. 342-347. (Nov. 2001).

Sukthankar, Rahul et al. "Dynamic Shadow Elimination for Multi-Projector Displays." Proceedings of Computer Vision and Pattern Recognition, pp. II: 151-157. (2001).

Takao, Naoya et al. "Tele-Graffiti: A Pen and Paper-Based Remote Sketching System." International Conference on Computer Vision, pp. II: 750. (2001).

Tokuda, Yasuhisa et al. "Ubiguitious Display for Dynamically Changing Environments." ACM Conference on Human Factors in Computer Systems. (Apr. 2003).

Yang, Ruigang et al. "PixelFlex A Reconfigurable Multi-Projector Display System." Proc. IEEE Visualization, pp. 167-174. (Oct. 2001).

Cook et al., "A Reflectance Model for Computer Graphics," ACM Transactions on Graphics, 1(1):7-24, 1982.

Debevec et al., "Acquiring the Reflectance Field of a Human Face," Proceedings of SIGGRAPH, 2000.

Debevec, "Rendering Synthetic Objects into Real Scenes: Bridging Traditional and Image-Based Graphics with Global Illumination and High Dynamic Range Photography," Computer Graphics, 32 (Annual Conference Serues):189-198, Aug. 1998.

Heidrich et al., "Canned Lightsources," Proceeding of the 9th Eurographics Workshop on Rendering, pp. 293-300, 1998.

Sato et al., "Acquiring a Radiance Distribution to Superimpose Virtual Objects onto a Real Scene," IEEE Transactions on Visualization and Computer Graphics, vol. 5, No. 1, Mar. 1999.

Trimel, "New Lighting Sensitive Display Techology Enhances Photorealism," Columbia University, Sep. 10, 2001.

International Preliminary Report on Patentability, International Application No. PCT/US2004/021400.

* cited by examiner

FIG. 4A
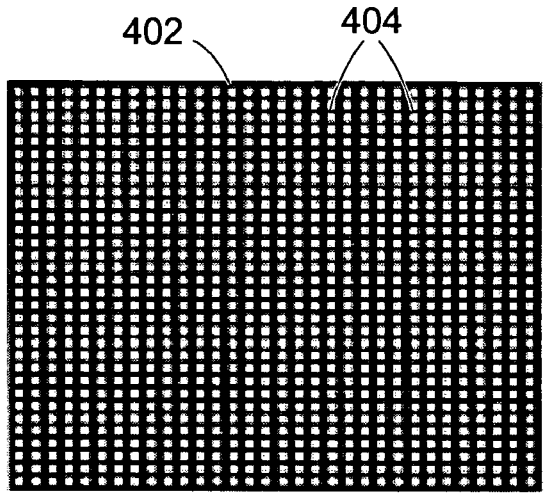
Displayed Image
FIG. 4B
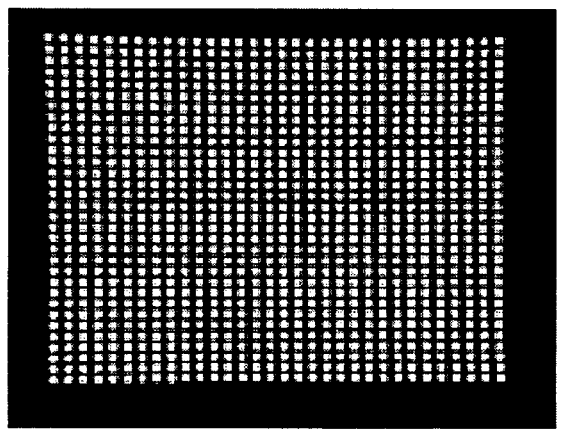
Captured Image
FIG. 4C
| ERRORS (display pixels) | X | Y |
|---|---|---|
| MAX. | 0.460 | 0.608 |
| RMS | 0.157 | 0.196 |
Geometric Calibration Errors Surface Uncompensated Measured Images (M)

Compensated Display Images (Ĩ)

Compensated Measured Images (M̃)

| Projected Brightness (graylevels) | RMS Error (graylevels) | | RMS Error (graylevels) | |
|---|---|---|---|---|
| | Without Comp. | With Comp. | Without Comp. | With Comp. |
| 50 | 28 | 2 | 24.5 | 1.0 |
| 100 | 67 | 6 | 61.4 | 2.0 |
| 150 | 81 | 8 | 60.9 | 2.6 |
| 200 | 61 | 8 | 35.0 | 2.9 |

Compensation Accuracy

Uncompensated Measured Image (M)

Compensated Measured Image ($\tilde{M}$)

Original (desired) Image (I)

Compensated Display Image ($\tilde{I}$)

Surface

Uncompensated Measured Images (M)

Compensated Display Images (Ĩ)

Compensated Measured Images ($\bar{M}$)

| Projected Brightness R, G, B | Max. Error R, G, B | | RMS Error R, G, B | |
|---|---|---|---|---|
| | Without Comp. | With Comp. | Without Comp. | With Comp. |
| 50, 50, 50 | 25, 26, 25 | 2, 3, 3 | 24.2, 25.4, 24.5 | 0.6, 0.8, 1.0 |
| 100, 100, 100 | 68, 69, 70 | 5, 7, 6 | 62.3, 62.4, 64.4 | 1.5, 1.3, 1.4 |
| 150, 150, 150 | 86, 90, 92 | 9, 9, 10 | 62.5, 64.4, 70.4 | 2.5, 2.2, 1.9 |
| 200, 200, 200 | 72, 81, 85 | 9, 10, 10 | 27.4, 30.3, 41.0 | 3.3, 3.2, 2.8 |

Compensation Accuracy

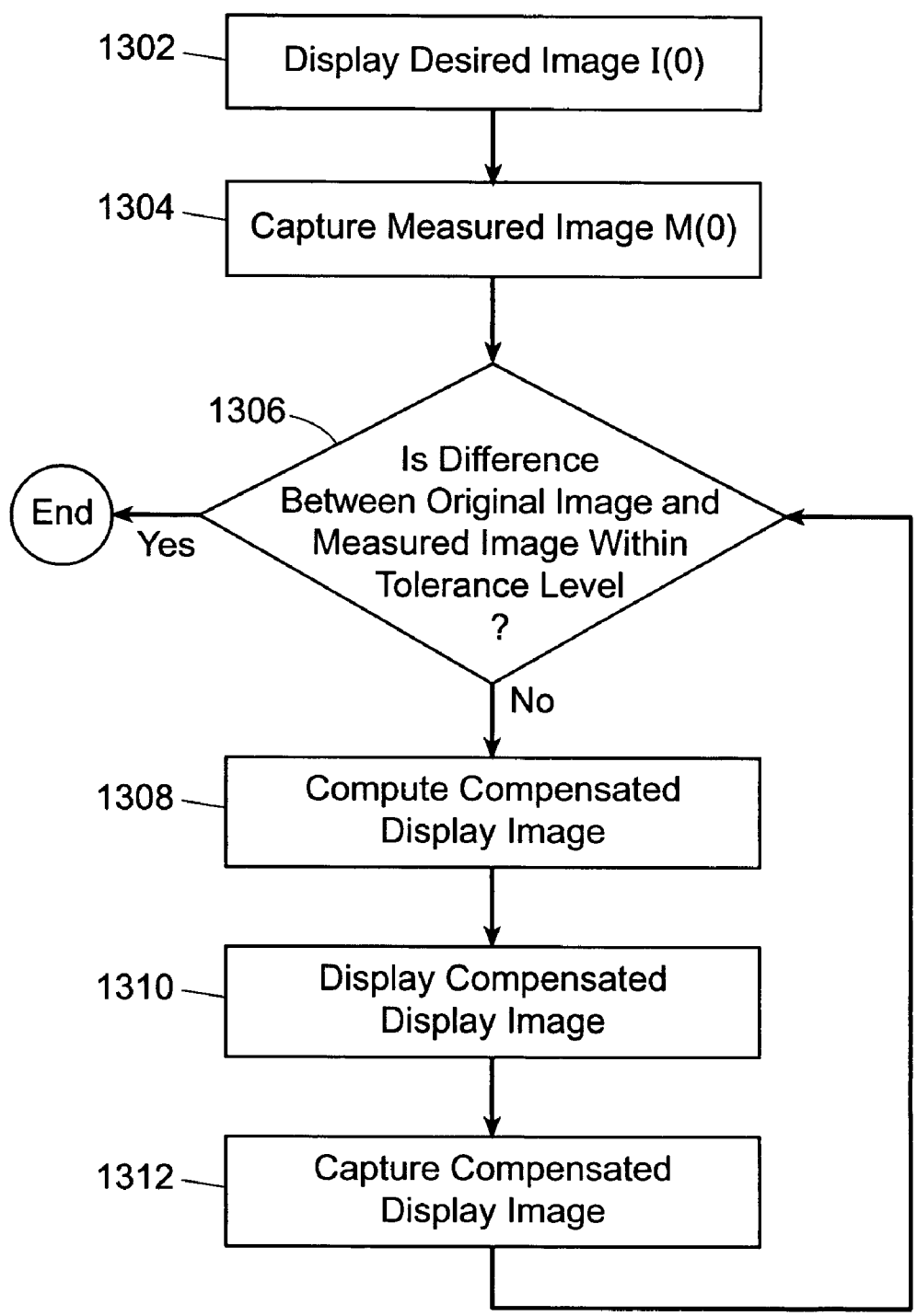

1404

1408

1402

1406

METHODS AND SYSTEMS FOR COMPENSATING AN IMAGE PROJECTED ONTO A SURFACE HAVING SPATIALLY VARYING PHOTOMETRIC PROPERTIES

CROSS REFERENCE TO RELATED APPLICATION

This application claims the benefit under 35 U.S.C. § 119 (e) of U.S. Provisional Patent Application No. 60/484,252, filed Jul. 2, 2003, which is hereby incorporated by reference herein in its entirety.

STATEMENT REGARDING FEDERALLY SPONSORED RESEARCH OR DEVELOPMENT

The government may have certain rights in the present invention pursuant to a grant from the Information Technology Research program of the National Science Foundation, Award No. 115-00-85864.

FIELD OF THE INVENTION

General speaking, the present invention relates to the display of images onto arbitrary surfaces using projectors. More particularly, the present invention relates to methods and systems for eliminating or reducing the effects of surface imperfections and/or color variations on the displayed images, as well as for controlling the appearance of a surface by displaying one or more images onto the surface, despite surface imperfections and/or color variations.

BACKGROUND

In the last decade, projection display technology has undergone a technological revolution. For example, projectors are now able to display images with very high spatial resolution and dynamic range. At the same time, projectors have become highly efficient in terms of both size and power consumption, while improved designs have resulted in substantial price reductions that have enabled greater usage for both business and consumer purposes. As a result of these advances, projectors have become somewhat ubiquitous, and are becoming more of an integral part of our everyday lives.

Several different types of display systems have been developed that use one or more projectors as the basic building blocks. For example, images produced by an array of projectors have been tiled to create large, ideally seamless displays having high resolution. Sets of projectors have also been used to project onto large surrounding surfaces to create immersive environments. Additionally, for example, multiple registered projectors have been used to project onto the same surface in order to display an image that optically combines several component images. This approach has been used to produce high quality images, e.g., images with regions having different depths of field, and images whose reflection components (specular reflection and diffuse reflection) are computed in parallel. Projectors have also be used to make a Lambertian white object appear to be one with that includes albedo variations, and to introduce transparency effects to the appearance of an object or to make an object appear reflective.

Each of the above types of display systems rely on some prior information about the projectors being used and the surfaces onto which they project. In many cases, for example, the geometric mapping between one or more projectors and a display surface being projected onto must be known. Additionally, for example, the photometric properties of the projectors must be calibrated and accounted for when displaying multiple, over-lapping images onto a display surface. One way to solve these geometric and photometric calibration problems has been to incorporate one or more cameras into the display systems. These cameras not only provide measurements needed for calibration, but can also be used to make the projection systems more intelligent and adaptive. For example, a camera can be used with multiple projectors to eliminate the casting of shadows on the projection surface. It has also been known to use a camera as a user interface component to enable a user to interact with the projected image. A camera can also be used to find a surface patch with constant reflectivity that can then be used as the display surface of the projector.

Despite the above advances, the versatility of current projector-based display systems remains significantly limited. For example, current projector-based display systems lack the ability to control the appearance of a surface having variations in its color. Additionally, for example, current projector-based display systems are limited by the requirement that a high quality surface be used in order to ensure a high quality image output. This requirement generally precludes the use of arbitrary surfaces, because such surfaces cannot be relied on to be highly reflective and white as is typically necessary to obtain optimal results with conventional projection systems. Rather, an arbitrary surface is extremely likely to have spatially varying photometric properties resulting from non-uniformity in color (e.g., when the surface being projected onto is a brick wall, a painting or poster on a flat wall, tiles of a ceiling, a portion of a grainy wooden door, etc.) and/or imperfections (e.g., paint imperfections, holes, nails, etc.). When an image is projected onto such an arbitrary surface in a conventional projection system, the image output is modulated by the spatially varying reflectance properties of the surface, and the image output becomes undesirable to human perception. Moreover, while it may be incorrectly assumed that this limitation can be remedied using a projector of high power (i.e., brightness), increasing the brightness does not change the proportion of the modulation.

Accordingly, it is desirable to provide projection methods and systems that are able to project their images onto virtually any surface (e.g., walls, doors, drapes, ceilings, etc.) while improving the photometric quality of their output. Additionally, it is desirable to provide methods and systems that are able to project images onto a surface in order to control the appearance of the surface.

SUMMARY OF THE INVENTION

In accordance with the present invention, methods and systems are provided for compensating imperfections and/or color variations of a projection surface such that the quality of images displayed onto the surface is preserved. Using the same or similar methods and systems, it is also possible to control the appearance of a projection surface.

In certain embodiments, the methods and systems according to the invention provide geometric mapping between points in the images to be displayed by the projector and the corresponding images that are captured by a camera. In other embodiments, geometric mapping generally need not be determined because the optics of the projector and the camera are coaxial, or because the mapping is otherwise known. For example, geometric mapping may be fixed or determined by the projector and camera manufacturer, such that geometric calibration may not be required for each surface.

According to various open-loop embodiments of the invention, in order to compensate for imperfections or color variations of a display surface, a detailed radiometric model of a projector-camera system is first created. Subsequently, a plurality of images are projected onto the surface and captured by the camera in order to perform the necessary radiometric calibration of the previously created model. Based on this calibration, a look-up table is produced that indicates the pixel values required to be projected onto the surface in order for a desired image to be observed. Based on this look-up table, images are compensated prior to being projected.

In various closed-loop, continuous feedback embodiments of the invention, radiometric modeling and calibration is not required. Rather, in these embodiments, the appearance of images being projected onto a surface is repeatedly measured by the camera, and these measurements are used to provide iterative image compensation until a desired level of compensation has been reached. In other embodiments of the invention, a combination of open-loop and closed-loop techniques is used. For example, in several of these embodiments, images are initially compensated using the radiometric model and the results of the radiometric calibration, after which these images are further compensated using feedback (e.g., to adapt to a dynamically changing image).

In one embodiment, the invention provides methods and systems for projecting a display image onto a surface that has spatially varying photometric properties, wherein the method comprises the steps of detecting the spatially varying photometric properties of the surface, compensating the display image based on the detected spatially varying photometric properties, and projecting the compensated display image onto the surface.

In a second embodiment, the invention provides methods and systems for projecting a display image onto a surface that has spatially varying photometric properties, wherein the method comprises the steps of performing radiometric calibration on the surface based on a radiometric model, compensating the display image to form a compensated display image based on the radiometric calibration so that a measured image has desired characteristics, and projecting the compensated display image onto the surface.

In a third embodiment, the invention provides methods and systems for projecting a display image that has spatially varying photometric properties, wherein the method comprises the steps of projecting a projected image based on the display image, capturing the projected image as a measured image, comparing the measured image with the display image, compensating the projected image based on the comparison between the measured image and the display image, and projecting the compensated projected image.

BRIEF DESCRIPTION OF THE DRAWINGS

The present invention is now illustrated in connection with the accompanying drawings, in which like references refer to like parts throughout, and in which:

FIG. 4(a) is an illustration of a displayed image having square calibration patches to be used for associating points in a display image and a measured image according to one embodiment of the present invention;

FIG. 4(b) is an illustration of the captured image resulting from the display of the illustration of FIG. 4(a) according to one embodiment of the present invention;

FIG. 4(c) is a table showing maximum and RMS errors that result from the mapping of test patches from the image of FIG. 4(a) using a piecewise polynomial model according to one embodiment of the present invention;

FIG. 13 is a flow chart illustrating various steps performed by components of the system of FIG. 1 in connection with a closed-loop compensation algorithm according to one embodiment of the present invention.

DETAILED DESCRIPTION OF THE PREFERRED EMBODIMENTS

Methods and systems are provided for displaying images onto an arbitrary surface such that the quality of the images is preserved despite surface imperfections or color variations. For example, according to the invention, these methods and systems may be used to display a still image (or movie) onto the side of a building such that any imperfections or color variations on the surface of the building does not substantially impact the appearance of the displayed still image (or movie). Using the same or similar methods and systems, it is also possible to control the appearance of a projection surface. For example, in accordance with the invention, an interior decorator may provide clients with a preview of the appearance of a new wallpaper pattern by projecting an image onto an existing wallpaper pattern inside the client's home. Additionally, for example, the color, pattern, or material of the client's furniture can be given a desired appearance. As yet another example, in education settings, a teacher may use the methods and systems described herein to project the appearance of a skin disease on a model.

According to several open-loop embodiments of the invention, the methods and systems use a detailed radiometric model and a calibration method to determine the pixel values required to be projected by a projector in order for a camera to observe a desired image. In various closed-loop embodiments, a feedback approach, rather than radiometric calibration, is used to provide the desired image compensation. In both the open-loop and closed-loop embodiments, geometric mapping is used to establish a correspondence between points in the images to be displayed by the projector and the corresponding points in the images that are captured by the camera.

Figure 1:
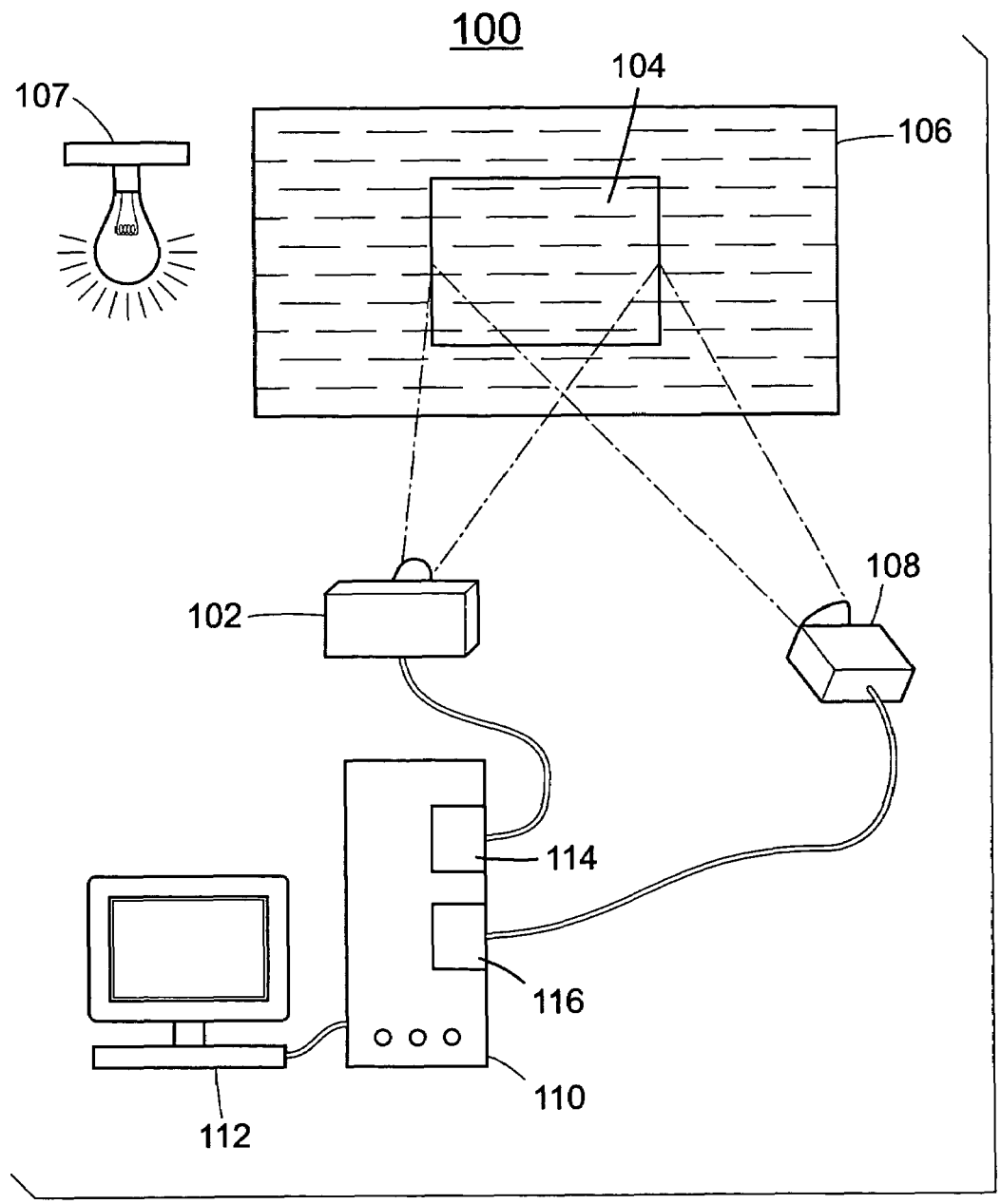
FIG. 1 is an illustration of one embodiment of a projector-camera system in which the present invention may be implemented.

FIG. 1 illustrates one embodiment of a projector-camera system 100 in which the present invention may be implemented. As shown, system 100 includes a projector 102 for projecting images onto an arbitrary surface 104. As an example, projector 102 may be a SONY SVGA VPL-CS5 projector, having a native resolution of 800×600 pixels. It will be understood, however, that any projector with suitable specifications may be used. Meanwhile, surface 104 may be any suitable type of surface. For example, surface 104 may be a portion of a wall 106 as shown in FIG. 1, which may have spatially varying photometric properties, such as being non-uniform in color and/or containing various types of imperfections surface (e.g., caused by nails or other embedded objects). It will be understood that, although surface 104 is shown to be a portion of a flat wall 106, the invention is not limited in this manner. For example, in other embodiments of the present invention, surface 104 may be the exterior surface of a three-dimensional object, such as a window curtain having one or more ruffles.

As shown in FIG. 1, a light source 107 may be present in the vicinity of system 100. Although light source 107 is shown to be a light bulb in FIG. 1, this need not be the case. For example, light source 107 may be another suitable type of artificial light, or may instead be a natural source of light (e.g., the sun, a burning fire, etc.) It will be understood that the invention is not limited by the type of light source 107 that is present in system 100, and also that in various embodiments of the present invention, system 100 may have no light source at all other than projector 102.

Also included in system 100 is a camera 108 for capturing images projected onto surface 104 by projector 102. In one embodiment of the invention, camera 108 is a SONY DXC 950 Power HAD model, having a resolution of 640×480 pixels. It will be understood that other types of cameras may also be used in accordance with the principles of the present invention. Moreover, while much of the description of the present invention provided below assumes that projector 102 has a higher resolution than camera 108 (as in the examples provided above), it will be understood that the invention is not limited in this manner. For example, in various embodiments of the present invention, projector 102 has the same resolution as camera 108. In other embodiments of the invention, meanwhile, camera 108 has greater resolution than projector 102.

System 100 also includes a computer 110 and a monitor 112 connected thereto, and although not shown in FIG. 1, may further include one or more input devices (e.g., a keyboard and mouse) connected to computer 110. Computer 110 may be, for example, a DELL PRECISION computer with an INTEL PENTIUM processor (1.8 GHz) and 1 Gb of SDRAM memory.

Images to be displayed on surface 104 may be sent from computer 110 to projector 102 via an ATI RADEON VE video card or any other suitable display device 114. Meanwhile, images from camera 108 may be captured by computer 110 using a MATROX METEOR II or any other suitable frame-grabber capture device 116. It will be understood that, in accordance with the principles of the present invention, signal processing for the open-loop and closed-loop algorithms described below may be occurring in a processor that is the central processing unit (CPU) of computer 110 or in either display device 114 or capture device 116.

Figure 2:
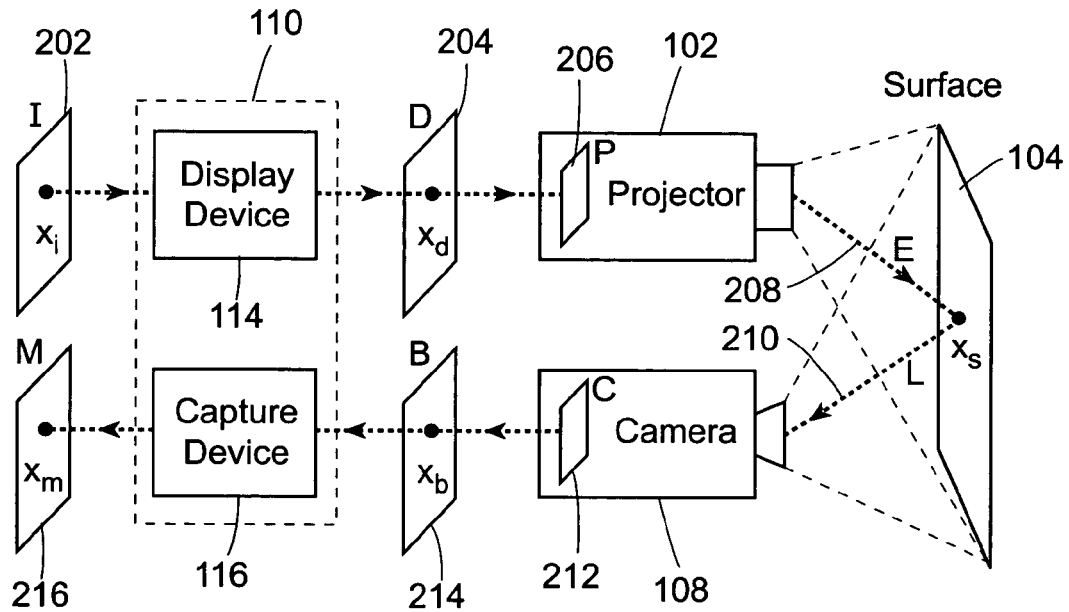
FIG. 2 is an illustrative dataflow diagram for the projector-camera system of FIG. 1 according to one embodiment of the present invention.

Turning to FIG. 2, an illustrative dataflow diagram 200 is provided for projector-camera system 100. As shown, display image (I) 202, which may be any suitable image chosen by a user of system 100, is processed by display device 114 (of computer 110). Processed image (D) 204 is then received by projector 102 as projector image (P) 206. The image projected by projector 102, which has a surface irradiance (brightness landing on the surface) (E) 208, is reflected by surface 104. The reflected image has a radiance (brightness leaving the surface) (L) 210 in the direction of camera 108, and is subsequently captured by camera 108. The captured image (C) 212 of camera 108 is provided as surface output (B) 214, and is then digitized by capture device 116 of computer 110 to obtain the final measured image (M) 216.

Open-Loop Algorithms

Figure 3:
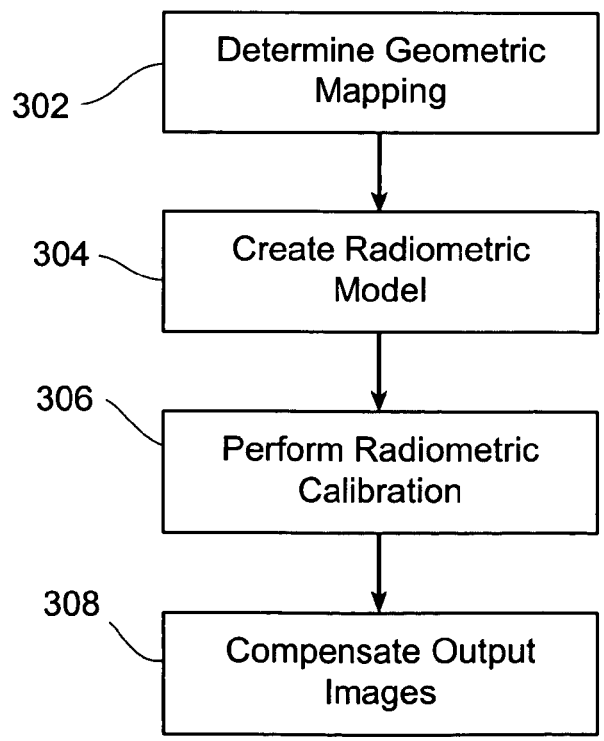
FIG. 3 is a flow chart illustrating the steps performed by components of the system of FIG. 1 in connection with one embodiment of an open-loop compensation algorithm according to the principles of the present invention.

FIG. 3 is a flow chart illustrating the key steps of an open-loop compensation algorithm according to various embodiments of the present invention. As explained in greater detail below, these steps can be used to enable projector 102 of system 100 to project images onto surface 104 of arbitrary surface 106 while improving the photometric quality of its output. As shown in FIG. 3, in step 302, the geometric mapping between display image 202 and measured image 216 may be determined. Next, at step 304, a radiometric model may be created, and then radiometric calibration may be performed at step 306. Finally, at step 308, each display image 202 may be compensated prior to projection onto surface 104 by projector 102. Each of these steps are explained in detail below.

Geometric Mapping

The first step in the flow chart of FIG. 3 is to establish a correspondence between points in display image 202 (that is, in the projector domain) and measured image 216 (that is, in the camera domain) at step 302. According to various embodiments of the invention, this geometric mapping between points in display image 202 and measured image 216 may be accomplished using second-order polynomials. For example, let a point $x_i=[x_i, y_i]^T$ in display image 202 map to a point $x_m=[x_m, y_m]^T$ in measured image 216, as shown in FIG. 2. In this case, the polynomial model can be concisely written as: $x_i=A\hat{x}_m$, $x_m=B\hat{x}_i$, where $\hat{x}_m=[x_m^2 \; y_m^2 \; x_m y_m \; x_m \; y_m \; 1]^T$, and $\hat{x}_i=[x_i^2 \; y_i^2 \; x_i y_i \; x_i \; y_i \; 1]^T$. Given a set of corresponding points in display image 202 and measured image 216, the coefficient matrices A and B, which may each be 2×6 matrices, can be computed using the least squares method which is known in the art.

In various embodiments of the invention, a single polynomial model may be used to achieve the above-described geometric mapping of points in display image 202 and measured image 216. In other embodiments of the invention, however, a piecewise polynomial model may be used. In these cases, for example, the image space may be divided into blocks, where each block has its own polynomial model. For example, a captured image may be divided into 4×4=16 regions, and a separate model may be computed for each of the regions.

Regardless of the particular number of regions, this type of approach (i.e., dividing the image space into blocks) may often be more effective than using a single polynomial model because it can accommodate for a variety of geometric distortions that may be inherent to system 100. For example, surface 104 may itself not be perfectly planar, but rather, at least partially curved. In this case, as long as the surface 104 is smoothly curved, the mapping within each local neighborhood (or block) can be approximated with great accuracy using a second-order polynomial. In addition, as another example, this polynomial model can effectively handle situations where the lenses of projector 102 and/or camera 108 introduce radial and/or tangential distortions.

It will be understood that the blocks defining the image space may be based not only on a rectangular coordinate system, but other coordinate systems as well. For example, in the case of a radial coordinate system, the shape of the blocks may provide greater flexibility in the type of mapping, and may thus provide greater accuracy. It should also be noted that greater accuracy may also be provided by using a higher order polynomial. Additionally, rather than using a piecewise polynomial, thin-plate splines and other well known methods may be used to approximate the mapping. Irrespective of the particular manner in which the mapping is achieved, the final geometric mappings in each direction between projector 102 and camera 108 may be stored as look-up tables, where each point in one domain is used as an index to obtain the corresponding point in the other.

In order to achieve the mapping described above, it is necessary to have a set of corresponding points in display image 202 and measured image 216. These points may be obtained, for example, using a display image 402 having 1024 square calibration patches 404 as shown in FIG. 4(a). The corresponding measured image 216 is shown in FIG. 4(b). In both of these images, the location of each patch 404 is represented by the centroid of the patch. At this point, it should be noted that the invention is not restricted by the particular orientation of projector 102, surface 104, and camera 108 with respect to each other. For example, as can be seen from the corresponding measured image 216 shown in FIG. 4(b), one or more of these components may be dissimilarly oriented with respect to the other two. It will be understood that the geometric mapping described takes such differences in orientation into account.

Patches 404 shown in FIG. 4(a) may be each be sequentially projected in separate images. Such a sequential projection of patches 404, however, requires the projection and capture of 1024 images, and may take over 30 seconds depending on several variables, such as the processing power of computer 110 and the time it takes for images to be projected and captured by projector 102 and camera 108, respectively.

According to another approach, the unambiguous projection of $N=2^n-1$ patches can be achieved using only n images. In the case of 1024 patches 402 described above, therefore, eleven images (not shown) may be projected and captured in order to uniquely associate the patches in the display and camera images. According to this approach, each of the patches 404 shown in FIG. 4(a) are indexed by a respective binary number. For example, a first patch 404 is indexed by the binary number "0000000000," an eleventh patch 404 is indexed by the binary number "0000001011," and the last of the 1024 patches 404 is indexed by the binary number "1111111111." Afterwards, eleven images are created, wherein each image uses a different binary coded combination of the 1024 patches 404, and these ten images are projected by projector 102 and captured by camera 108. In the first image, only the patches 404 whose index has a "1" in its zero (i.e., least significant) bit are displayed. In the second image, only the patches who index has a "1" in its one (e.g., second least significant) bit are displayed, and so forth.

In theory, the use of eleven images as described above may permit the unambiguous projection of up to 2047 patches, which is clearly more than enough for the example provided above in which only 1024 patches are being projected. It should be noted, however, that the invention is not limited by the use of only eleven images.

As illustrated by the table of FIG. 4(c), which shows the maximum and RMS errors produced by the mapping for test patches 404, the piecewise polynomial model may result in very high geometric mapping accuracy (i.e., the accuracy of the mapping is sub-pixel). It will be understood that these error values represent the average of the distances between where a point should be projected and where it actually is actually projected.

Figure 5:
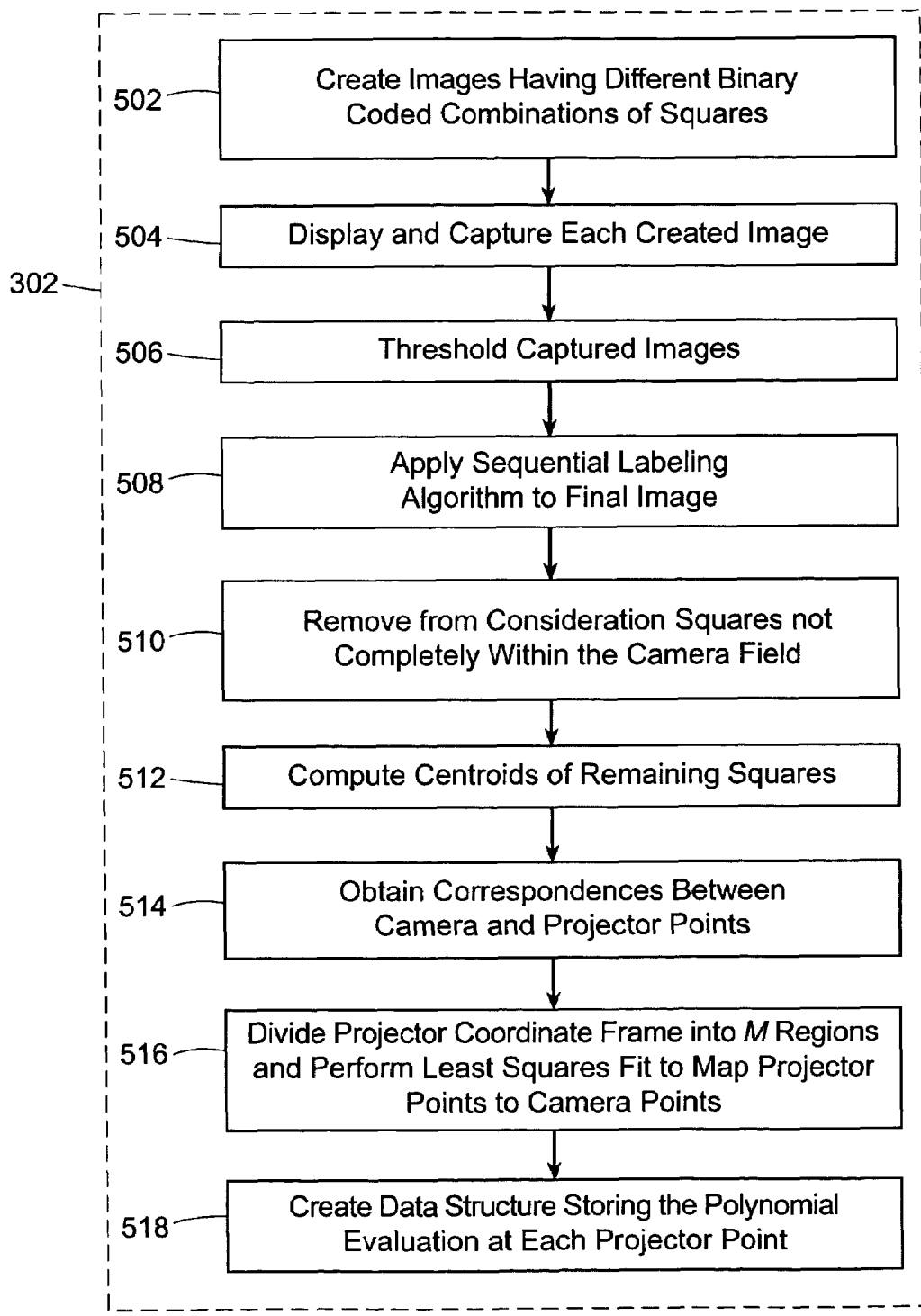
FIG. 5 is a more detailed flow chart illustrating the steps performed for the first step of the flow chart shown in FIG. 3 according to one embodiment of the present invention.

Referring now to FIG. 5, an illustrative process for determining the geometric mapping (step 302 of FIG. 3) is now described in greater detail. It will be understood, however, that the particular steps shown in the flow chart of FIG. 5 and discussed below are illustrative only, and that the invention is not limited in this manner.

In step 502, eleven 800×600 projector images 0-10 are created. The images each include different combinations of some or all of the 1024 evenly distributed squares. The centroids of these squares are the actual projector data points. For example, as described in the example provided above, in the first image (image 0), only those squares whose index (represented in binary form) has a "1" in its zero bit are displayed. Meanwhile, the final image (image 10) has all 1024 squares displayed.

At step 504, each of the eleven images created according to step 502 are projected and captured. Next, at step 506, each of the captured images undergo thresholding in order to identify each of the squares in the images. It will be understood that any suitable thresholding technique as known in the art may be used.

At step 508, the sequential labeling algorithm is applied to the captured image containing all of the squares (i.e., image 10). This algorithm is known in the art, and is described, for example, in "Robot Vision (MIT Electrical Engineering and Computer Science)," by Berthold Horn (MIT Press, 1986), which is hereby incorporated by reference herein in its entirety. This in turn yields a list of all the distinct square regions seen by a camera. Afterwards, regions that are not completely within the camera field of view are removed from consideration (step 510), and the centroids of the remaining regions are computed (step 512).

According to step 514, each of the computed centroids are "traced" through the captured images 0-9, and a ten bit binary number is created whose $n^{th}$ bit is "1" if the value of the centroid being traced is "1" in image n. The decimal representation of this number is the index of the square in the original projector image, and thus, the correspondences between camera points and each of the original projector points is obtained.

Next, at step 516, the projector coordinate frame (having a resolution of 800×600) is divided into m regions, where each region encloses within it a subset of the original projected points. For each of these m regions, the enclosed data points and correspondences are used to perform a least-squares fit on a second order polynomial that maps projector points to camera points. This involves creating two matrices A and B using the data points enclosed in that region, and solving a linear equation of the form Ax=B (using, for example, Gauss-Jordan elimination, a known variant of Gaussian elimination). The resultant vector x contains the coefficients for the polynomial, and these coefficients can be used to map any projector point to any camera point, including locations between camera pixels (hereinafter, "floating point camera locations"). It should be noted that a floating point camera location will be necessary because there are more projector pixels than there are camera pixels in this example, although this will not always be the case. Finally, at step 518, a data structure is created that stores the result of the polynomial evaluation (i.e., the corresponding floating point camera location) at each projector point.

It will be understood that, in various embodiments of the invention, projector-camera system 100 is designed such that the mapping between the display image 202 and measured image 216 is fixed (and thus unaffected by the location or the shape of surface 104). This may be achieved by making the optics of the projection and the imaging systems coaxial. For example, the same lens can be used by projector 102 and camera 108, wherein a beam-splitter is placed behind the lens. Alternatively, for example, two different lenses can be used for projector 102 and camera 108, where a beam-splitter is placed in front of the two lenses. It will be understood that, in both of these cases, there may be no need for geometric calibration as described above (i.e., step 302 may not be required). Moreover, the use of coaxial optics has the added benefit that all points that are visible to projector 102 should also be visible to camera 108 and vice versa (i.e., there is no occlusion).

Radiometric Model

As shown in the flow chart of FIG. 3, step 304 according to the principles of the present invention involves the creation of a radiometric model. This step is now described in detail.

Referring again to FIG. 2, a model may be developed for a single point on surface 104, with the understanding that the same radiometric model can be used (with possibly different parameters) for any other point on surface 104. Moreover, it will be understood that each of the components in system 100 will typically have its own unknown, non-linear radiometric response function. Given that the process of radiometric compensation requires these responses to be inverted, as explained in greater detail below, it will be assumed that these individual responses are monotonic (i.e., the output of these responses is expected to increase as their input increases).

While projector 102 and camera 108 are expected to have multiple spectral (color) channels, initially, it is initially assumed that the system has only a single channel denoted by K. Referring to dataflow diagram 200 of FIG. 2, a pixel value $I_K$ in display image 202 is transformed to $D_K$ in processed image 204 by the radiometric transfer function $d_K$ of display device 114 according to the following equation: $D_K=d_K(I_K)$. Meanwhile, the output of display device 114 is mapped by the radiometric response of the electronics of projector 102 to projector image 206, having a projector brightness value described by the following equation: $P_K=p_K(D_K)$. This projector brightness is modulated by the spectral response $w_K(\lambda)$ of the projector channel, where $\lambda$ is the wavelength of light, to produce a surface irradiance 208 $E_K(\lambda)=P_K w_K(\lambda)$ at a point on surface 104. Then, the radiance 210 of this point in the direction of camera 108 can be written as: $L_K(\lambda)=P_K w_K(\lambda)s(\lambda)$, where $s(\lambda)$ is the spectral reflectance of the point. Assuming that camera 108 measuring the radiance of the surface point has a single spectral channel L with quantum efficiency $q_L(\lambda)$, the irradiance of captured image 212 is: $C_L=P_K\int w_K(\lambda)s(\lambda)q_L(\lambda)d\lambda$. Then, this irradiance measured by camera 108 is processed by its electronics to produce the output of camera 108: $B_L=b_L(C_L)$, where $b_L$ is the radiometric response of camera 108. Finally, the output of camera 108 is mapped to the final measured brightness of measured image 216 by capture device 116 (frame-grabber) of computer 110: $M_L=m_L(B_L)$.

Taken together, the above expressions provide the relationship between a brightness in display image 202 and the final measured image 216 in the case where system 100 has only a single color channel. Using this radiometric model, moreover, it is also possible to explore the case where system 100 has multiple color channels. It should be noted that the spectral responses of projector and camera channels can be arbitrary. Moreover, from the perspective of compensation, it can be assumed that these spectral responses are unknown and that the calibration and compensation schemes discussed herein must be able to handle arbitrary and unknown channel responses.

Assuming that projector 102 and camera 108 of system 100 each have three color channels (Red, Green, Blue), or (R, G, B), the radiometric model provided above can be extended from one color to three colors using the following equation:

$$\begin{bmatrix} C_R \\ C_G \\ C_B \end{bmatrix} = \begin{bmatrix} V_{RR} & V_{RG} & V_{RB} \\ V_{GR} & V_{GG} & V_{GB} \\ V_{BR} & V_{BG} & V_{BB} \end{bmatrix} \begin{bmatrix} P_R \\ P_G \\ P_B \end{bmatrix}, \quad (1)$$

where:

-continued $$V_{KL} = \int w_K(\lambda)s(\lambda)q_L(\lambda)d\lambda,$$

$$P_K = p_K(d_K(I_K)),$$

$$C_L = b_L^{-1}(m_L^{-1}(M_L)).$$

It should be noted that, although it has been assumed that projector 102 and camera 108 each have three color channels, the invention is not limited in this manner and each may have any number of color channels. For example, projector 102 may have three color channels, while camera 108 may have five color channels (multi-spectral). Moreover, it should be understood that, in light of the above model, the spectral responses of the color channels of projector 102 and camera 108 can overlap with each other in many ways. For example, when the green channel of projector 102 is increased, it is expected that the response of the green channel of camera 108 will also increase. However, because the red and blue sensors in camera 108 may also be slightly sensitive to green light, increasing the green channel of projector 102 may also result in an increase in the response of the red and the blue channels of camera 108. This type of color "overlapping" is taken into account in the present invention.

The couplings between projector and camera channels and their interactions with the spectral reflectance of the surface point will all be captured by the matrix V, referred to herein as the color mixing matrix. It will be understood that, because the matrix V does not include the non-linear response functions of the individual components of projector-camera system 100, the above model successfully decouples brightness non-linearities from the spectral characteristics of system 100. It will also be understood in light of the following that the matrix V accounts for the mixing of colors of the spectral responses of surface 104 with the responses of the different channels of projector 102 and camera 108. As described below, the inverse of the matrix V can be used to "unmix" the red, greed, and blue color channels such that the input color channels of projector 102 and the output color channels camera 108 can be treated as separate and independent from one another. Moreover, as explained below in greater detail, using the projection of all possible levels of gray (R=G=B), for example for levels 0-255 on an 8 bit projector, it is possible determine the relationship between the unmixed red color channel of projector 102 with the unmixed red color channel of camera 108. Similarly, the relationships involving the green and blue color channels can also be determined. Moreover these three functions relating an unmixed color channel in projector 102 to the same channel in camera 108 is, in general, a non-linear function represented by a look-up table. In embodiments of the invention described in detail below, different non-linear functions are computed for each pixel. However, it will be understood that, in other embodiments, it may be assumed that these non-linear functions are the same for each pixel (and thus can be determined by a spatially varying image, a dark image and a light image). By making this generally true assumption on projectors and cameras, it becomes possible to significantly reduce the time required to calibrate system 100 and to decrease the parameters of the calibrated model for system 100 that need to be stored and referenced when compensating images.

Radiometric Calibration and Output Compensation

Once the radiometric model for system 100 is in place, it becomes possible to develop techniques for surface compensation in accordance with the principles of the present invention. This is accomplished in part by performing radiometric calibration and compensating output images (steps 306 and 308 of FIG. 3) for system 100 in accordance with the principles of the present invention, as explained below.

It should be noted that, because system 100 described above is intended to be able to use an arbitrary projector 102 and an arbitrary camera 108, the compensation algorithm has been developed to handle this same general setting. It will be understood, however, that a projector manufacturer can easily design a system such that the responses and spectral properties of the projector and camera are matched to maximize performance.

One general compensation algorithm is discussed below in three stages, starting with the most restrictive setting and finishing with the most general one. As in the case of the radiometric model, the compensation algorithms are described for a single pixel with the understanding that all pixels may be treated in a similar manner. It should also be understood that, although each pixel may be treated independently as described below, various embodiments of the present invention may include pre-processing or post-processing an image to be displayed using a filter such as blurring or sharpening in order to remove the effects of blurring or sharpening introduced in projector 102 or camera 108 by the manufacturer.

Gray World Case

Radiometric calibration and image compensation (steps 306 and 308 of FIG. 3) is first considered for the "gray world" case. In this special case, projector 102 only outputs grayscale images (equal values in the R, G, and B channels), camera 108 is a black and white camera with a broad spectral response, and surface 104 is gray with possibly varying albedo. Projector image 206 can thus be represented by a single brightness, $P_{BW}$, and the spectral response for projector 102 is given by: $w_{BW}(\lambda) = w_R(\lambda) + w_G(\lambda) + w_B(\lambda)$. Moreover, the spectral response of surface 104 is given by $s(\lambda) = p$, where p is the albedo of the surface point. In addition, the black and white camera has a quantum efficiency $q_{BW}(\lambda)$ and produces a single brightness value $C_{BW}$. Therefore, the radiometric model for system 100, according to the above parameters, can be written as: $C_{BW} = V_{BW} P_{BW}$, where:

$$V_{BW} = \sum_{K=R,G,B} \sum_{L=R,G,B} V_{KL}.$$

It will thus be understood that, for this special case, the radiometric model for system 100 can be represented using a single non-linear monotonic response function h (where h(x) increases as x increases) as follows: $M_{BW} = h(I_{BW})$, where h includes the non-linear effects of all the individual components of system 100. In order to determine the response function h, such that the display image brightness $I_{BW}$ needed to produce any desired measured image brightness $M_{BW}$ can be computed, any suitable calibration procedure may be used in accordance with the principles of the present invention. For example, in one embodiment of the invention, a set of 255 display images 202 (in the case where projector 102 has eight bits per channel) are displayed in succession, and the corresponding measured images 216 are recorded. In this manner, a sampled discrete response function can be obtained for each pixel in the camera and the projector. This discrete response function is then inverted to obtain discrete samples of the inverse response function $h^{-1}$. The inverse response samples are then pre-processed to make the function monotonic, where the closest monotonic value is used in place of each sample that would make the function non-monotonic. Then, the new samples are interpolated to obtain a continuous inverse response function, which is then uniformly sampled and stored as a one-dimensional look-up table. A similar process is described in more detail below, with reference to FIG. 11, in connection with the general case involving color mixing.

It should be noted that, although the forward response function h is sampled using 255 display images 202 with substantially uniformly increasing color intensity during the aforementioned calibration process, the inverse response is generally not sampled because it is a non-linear function that would introduce further inaccuracy if sampled.

Following the completion of the above-described radiometric calibration (step 306 of FIG. 3), a user-selected display image 202, also referred to as the "original display image," may be compensated according to the invention prior to being projected onto surface 104. In order to apply compensation according to the invention, at step 308 of FIG. 3, the calibrated inverse response $h^{-1}$ is used to compute the "compensation image" $\tilde{I}$ that can be applied to system 100 in order to obtain the desired "compensated output" $\tilde{M}$. It will be understood that, as used below, an "uncompensated output" M is merely the measured image 216 obtained when the original display image is provided to system 100 and displayed by projector 102 onto surface 104, but has not been compensated according to the invention.

Figure 6A:
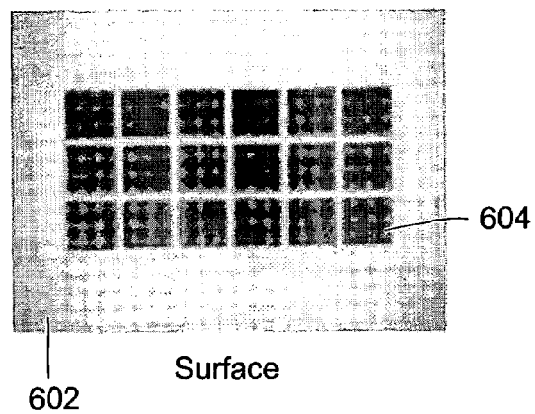
FIG. 6(a) is an illustration of a surface having color variations that was used in testing one embodiment of the present invention.
Figure 6B:
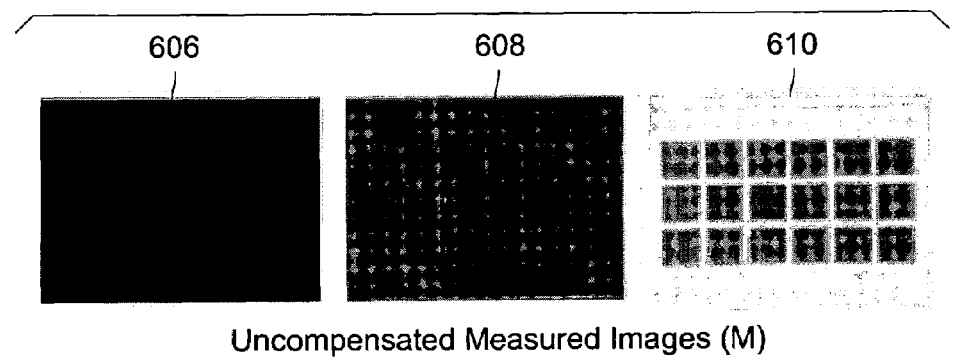
FIG. 6(b) is an illustration showing uncompensated output images on the surface of FIG. 6(a) as measured according to one embodiment of the present invention for three flat-gray original display images.
Figure 6C:
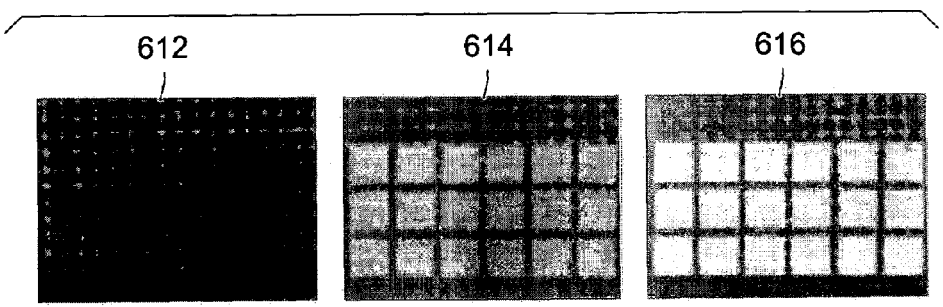
FIG. 6(c) is an illustration showing computed compensation patterns according to one embodiment of the present invention in connection with the display of three flat gray images onto the surface of FIG. 6(a)
Figures 6D, 6E:
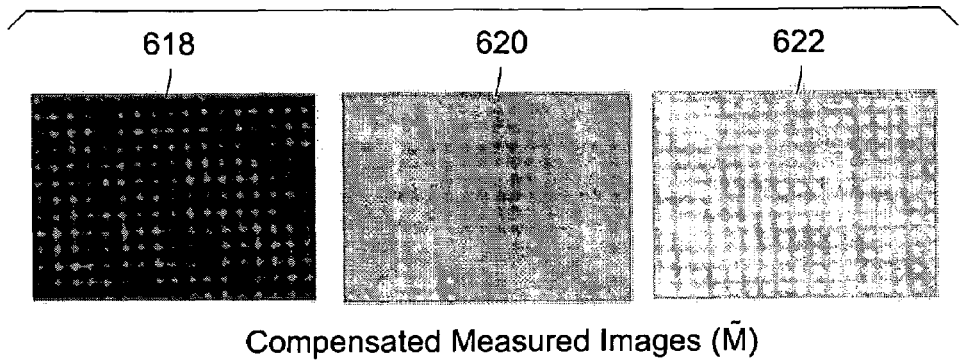
FIG. 6(d) is an illustration of the compensated output images according to one embodiment of the present invention as measured by a camera following the display of the compensation patterns of FIG. 6(c) on the surface of FIG. 6(a)
FIG. 6(e) is a table showing maximum and RMS errors for the uncompensated and the compensated outputs of FIGS. 6(b) and 6(d), respectively.

For example, FIG. 6(a) shows a surface 602 with dark gray squares 604 that was used to test the "gray world" algorithm described above. FIG. 6(b) shows three uncompensated measured images (M) 606, 608 and 610 when no compensation is applied as measured by camera 108 for 100, 150, and 200 gray level flat gray display images, respectively. As expected, squares 604 of surface 602 are clearly visible in uncompensated measured images 608 and 610. With regard to uncompensated measured image 606, it should be noted that squares 604 of surface 602 would also be clearly visible if not for the dark shading of the displayed image. FIG. 6(c) shows the compensated display images ($\tilde{I}$) 612, 614, and 616 that were generated by computer 110 in accordance with the compensation algorithm described above and that will be projected onto surface 602. FIG. 6(d) shows the corresponding compensated measured images ($\tilde{M}$) 618, 620, and 622, based on the projection of compensated display images 612, 614, and 616, respectively, as measured by camera 108. As can be seen in FIG. 6(d), the squares 604 on surface 602 have almost completely vanished in the compensated measured images 618, 620, and 622. FIG. 6(e) summarizes the accuracy of the compensation performed by system 100, where maximum and RMS errors (in gray levels) are shown for uncompensated measured images 606, 608, and 610 and compensated measured images 618, 620, and 622 for four different flat-gray input images (having gray levels of 50, 100, 150, and 200). It should be noted that, as illustrated by FIG. 6(e), the RMS errors are less than three gray levels in the compensated case, while they are above substantially larger in the uncompensated cases.

Even though the errors in compensated measured images 618, 629, and 622 shown in FIG. 6(d) are very small, faint squares are still slightly visible. This is because a human observer is very sensitive to sharp discontinuities in an image, and can detect such discontinuities even if the difference in brightness on the two sides of the discontinuity is very small. It is possible, however, to improve the compensation for surface irregularities with very sharp edges (e.g., squares) using a camera 108 that has a higher (preferably substantially higher) resolution than projector 102. It will be understood that an improvement in compensation may also be achieved by more precisely controlling the brightness of projector 102 (e.g., using twelve bits instead of eight bits), or by using a projector 102 with greater dynamic range (i.e., a larger ratio of brightest value to darkest value). It should also be understood by those skilled in the art that the use of flat-gray test images is the most stringent test of system 100, given that the test images themselves do not include any features that divert the observer's attention from any imperfections in the compensated measured images.

Figure 7B:
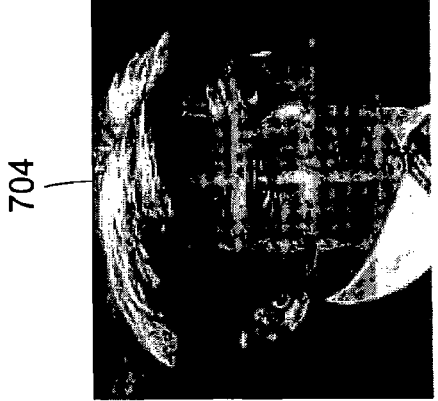
FIG. 7(b) is an illustration showing an uncompensated output image on the surface of FIG. 6(a) as measured according to one embodiment of the present invention for the display image of FIG. 7(a)
Figure 7D:
FIG. 7(d) is an illustration of the compensated output image according to one embodiment of the present invention as measured by a camera following the display of the compensation pattern of FIG. 7(c) on the surface of FIG. 6(a)
Figure 7A:
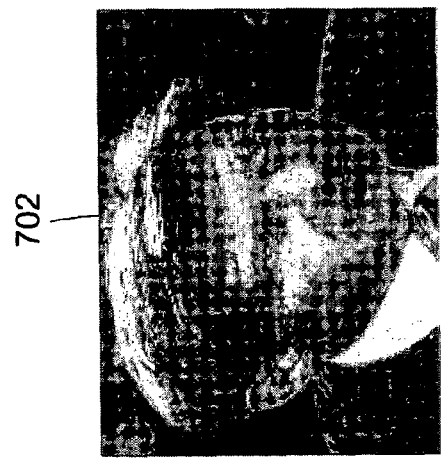
FIG. 7(a) is an illustration of an original facial image having color variations that was used in testing one embodiment of the present invention.
Figure 7C:
FIG. 7(c) is an illustration showing the computed compensation pattern according to one embodiment of the present invention in connection with the display of the image of FIG. 7(b) onto the surface of FIG. 6(a)

Turning to FIG. 7(a), an original display image (I) 702 is shown that is to be projected onto surface 602 of FIG. 6(a) using projector 102. FIG. 7(b) shows uncompensated measured image (M) 704 (i.e., the image that would be observed on surface 602 when compensation is not being provided by system 100). Meanwhile, FIG. 7(c) shows compensated display image ($\tilde{I}$) 706, the image computed by computer 110 and projected by projector 102 according to the invention. The resulting compensated measured image ($\tilde{M}$) 708 is shown in FIG. 7(d). As illustrated by FIGS. 7(a) and 7(d), compensated measured image 708 looks almost indistinguishable from original display image 702.

Independent Color Channels Case

Next, radiometric calibration and image compensation are considered according to steps 306 and 308 of FIG. 3 for the case of "independent color channels." In this case, the color channels of system 100 are independent (i.e., the spectral response of each color channel of camera 108 only overlaps with the spectral response of the same color channel of projector 102). Accordingly, all of the cross terms in the color mixing matrix V are zero ($V_{KL}=0$ for $K \ne L$), and thus, V=I.

There are many reasons for considering this case of independent color channels. One such reason is that a projector manufacturer may use a camera that has narrow spectral bands that satisfy the above constraint, such that the calibration procedure becomes simpler than in the general case. Another such reason is that, in evaluating the general compensation algorithm, it may be desirable to compare its performance with the independent channel case.

Given that V=I in the case of independent color channels, the radiometric model can be determined by the following three non-linear response functions: $M_R=h_R(I_R)$, $M_G=h_G(I_G)$, and $M_B=h_B(I_B)$. It should be noted that these three response functions (and their inverses) can be determined using the same procedure as described above in connection with the gray world case. As in that case, a set of gray scale images are applied to projector 102 and the corresponding set of color images are captured using camera 108. The calibration results for each pixel may then be stored as three one-dimensional look-up tables that represent the inverses of the response functions above.

With reference to step 308 of FIG. 3, for the independent color channels case, the pixel colors may be denoted as sets of three channel values: $I=[I_R I_G I_B]^T$. As set forth above, I is the original display image 202, M is the measured image 216 when compensation is not applied, $\tilde{I}$ is the compensated display image 202 generated by computer 110, and $\tilde{M}$ is the resulting compensated measured image 216.

Figure 8A:
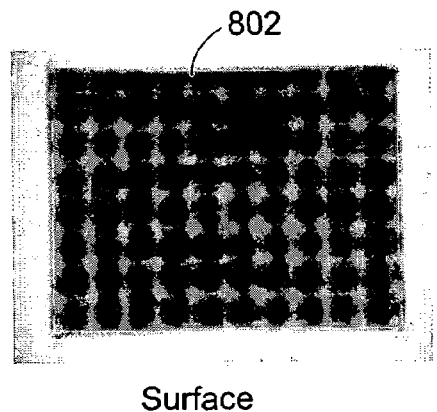
FIG. 8(a) is an illustration of a surface having color variations that was used in testing another embodiment of the present invention.
Figure 8B:
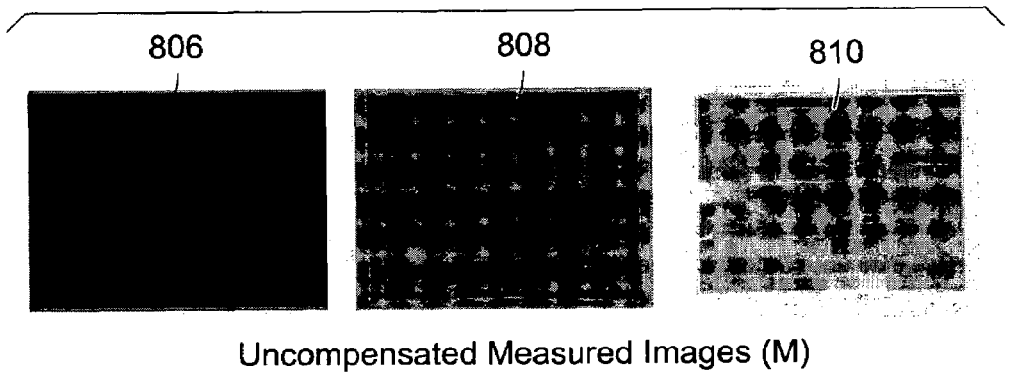
FIG. 8(b) is an illustration showing uncompensated output images on the surface of FIG. 8(a) as measured according to one embodiment of the present invention for three flat-gray original display images.
Figure 8C:
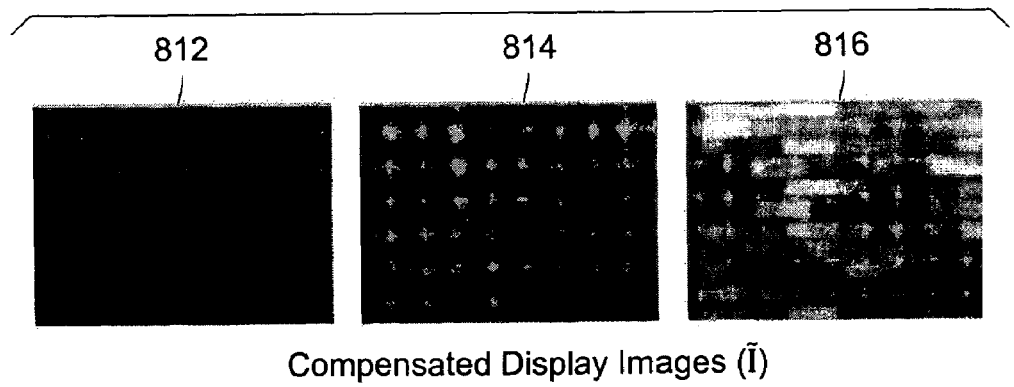
FIG. 8(c) is an illustration showing the compensation patterns computed according to one embodiment of the present invention in connection with the display of the images of FIG. 8(b) onto the surface of FIG. 8(a)
Figures 8D, 8E:
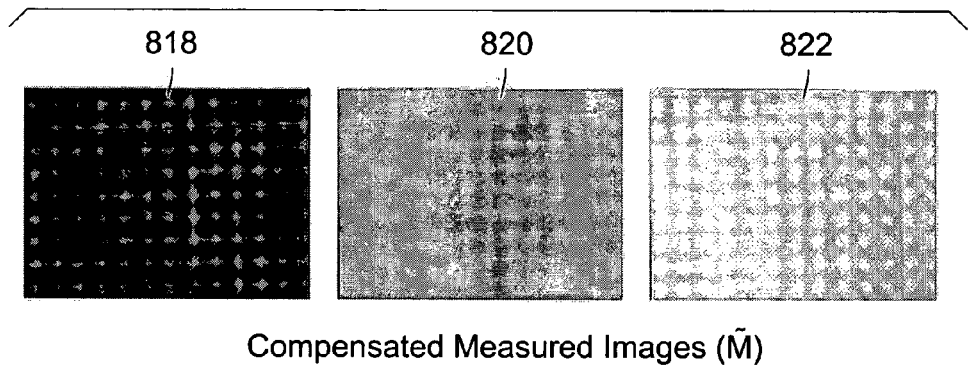
FIG. 8(d) is an illustration of the compensated output images according to one embodiment of the present invention as measured by a camera following the display of the compensation patterns of FIG. 8(c) on the surface of FIG. 8(a)
FIG. 8(e) is a table showing maximum and RMS errors for the uncompensated and the compensated outputs of FIGS. 8(b) and 8(d), respectively.

FIG. 8(a) shows a brick-wall surface 802 having non-uniform color that was used in an independent color channels experiment. As in the gray world experiment described above in connection with FIG. 6, flat-gray images (having gray levels of 100, 150, and 200) were projected by projector 102 and the images that were obtained with and without compensation were compared. FIG. 8(b) shows the uncompensated measured images (M) 806, 808, and 810 that were observed on surface 802 when compensation was not used) by camera 108 for gray levels 100, 150, and 200, respectively. FIG. 8(*c*) shows the compensated display images (Î) 812, 814, and 816 that were generated by computer 110 using the compensation algorithm and projected onto surface 802. FIG. 8(*d*) shows the corresponding compensated measured images (M̂) 818, 820, and 822 as measured by camera 108. Finally, FIG. 8(*e*) summarizes the compensation accuracy, where maximum and RMS errors (in gray levels) are shown for the uncompensated and the compensated outputs. It should be noted that several artifacts may remain in compensated images according to the invention due to the limits of the color independence assumption made in the algorithm. In general, saturated colors will be handled better using the algorithm described below due to the presence of color mixing.

Color Mixing Case

Finally, steps 306 and 308 of FIG. 3 are considered for the more general case of color mixing. In this case, the values of the matrix V, which describe the mixing of colors among surface 104 and the different color channels of projector 102 and camera 108, are not constrained in any way. Moreover, the matrix V is computed without any prior knowledge regarding projector 102 by using the response function of the camera 108 plus capture device 116, which takes into account the non-linear mapping introduced by these devices.

It will be appreciated that the response function of camera 108 and capture device 116 may be determined in many ways. For example, the radiometric response of the three channels of these devices can be determined by changing the exposure of the camera and/or using a calibration chart as known in the art. Other methods which are known in the art have also been developed for finding the response functions of an imaging system without prior knowledge of scene radiances. It should be noted that, regardless of the method used, the calibration of camera 108 and capture device 116 needs to be done only once. Thereafter, the known imaging radiometric responses enable the mapping of any measured color to the corresponding color detected by camera 108.

Figure 9:
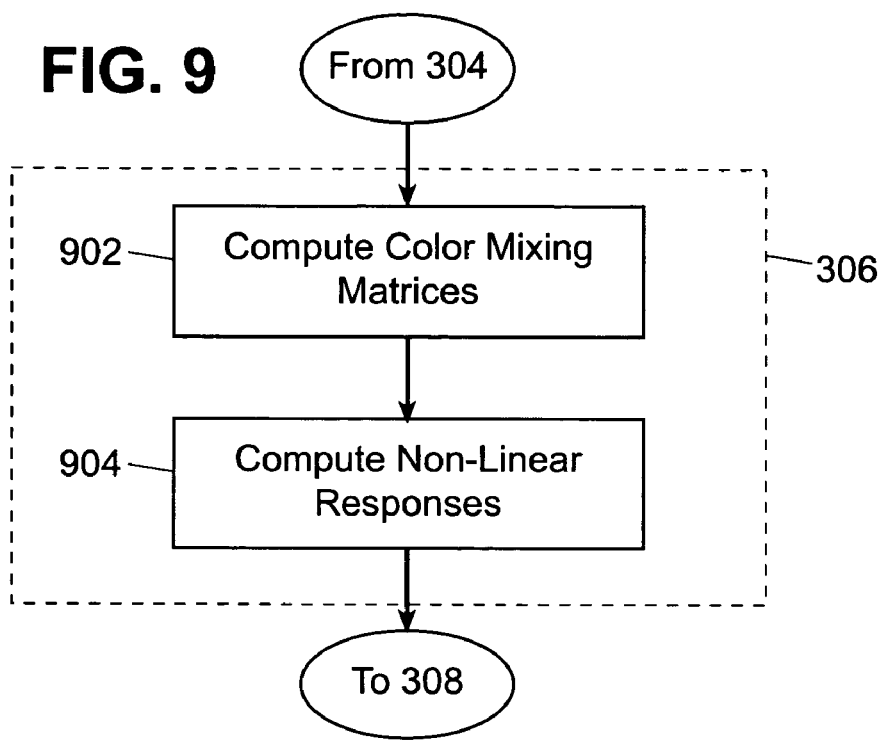
FIG. 9 is a more detailed flow chart illustrating the steps performed for the third step of the flow chart shown in FIG. 3 according to one embodiment of the present invention.

The radiometric calibration (step 306) for this general case has two stages, as illustrated by the flow chart of FIG. 9. First, the matrix V for each pixel is computed (step 902). Then, the non-linear responses of the projector for each pixel are also computed (step 904). These two stages are described in greater detail below with reference to FIGS. 10-11.

To compute matrix V (step 902), its diagonal elements are constrained to be equal to unity ($V_{KK}=1$). It should be noted that this constraint is in practice not restrictive, given that fixing the diagonal elements can be viewed as introducing unknown scale factors associated with the three rows of the matrix V that can be absorbed by the unknown radiometric responses on the projection side of system 100, which have not yet been determined.

Next, two different display colors are applied at a pixel where the two colors only differ in one of the three channels. Assume, for example, that the red channel is the channel in which the two colors differ as shown below:

$$I^{(1)} = \begin{bmatrix} I_R^{(1)} \\ I_G^{(1)} \\ I_B^{(1)} \end{bmatrix}, I^{(2)} = \begin{bmatrix} I_R^{(2)} \\ I_G^{(1)} \\ I_B^{(1)} \end{bmatrix}.$$

From equation (1), we have:

$$\begin{bmatrix} C_R^{(1)} \\ C_G^{(1)} \\ C_B^{(1)} \end{bmatrix} = V \begin{bmatrix} P_R^{(1)} \\ P_G^{(1)} \\ P_B^{(1)} \end{bmatrix} \text{ and } \begin{bmatrix} C_R^{(2)} \\ C_G^{(2)} \\ C_B^{(2)} \end{bmatrix} = V \begin{bmatrix} P_R^{(2)} \\ P_G^{(1)} \\ P_B^{(1)} \end{bmatrix}.$$

Given that only the red channel of the input has changed, the corresponding changes in the three channels are simply: $\Delta C_R = V_{RR}\Delta P_R$, $\Delta C_G = V_{RG}\Delta P_R$, and $\Delta C_B = V_{RB}\Delta P_R$. Moreover, because $V_{RR}=1$, it will be understood that $\Delta P_R$ and $\Delta C_R$ are equal, and thus:

$$V_{RG} = \frac{\Delta C_G}{\Delta C_R} \text{ and } V_{RB} = \frac{\Delta C_B}{\Delta C_R}. \quad (2)$$

Similarly, the procedure above is repeated for the green and blue channels, using two display images for each of these channels, in order to complete matrix V. Regarding this calibration procedure, it should be noted that the matrix V for each pixel (point on surface 104) may be computed by projecting six images (two per channel), although in various embodiments, only four images are used because the initial image for all three channels can be the same. However, if the matrix V needs to be computed with very high accuracy, more that six display images may be used, in which case the expressions provided in equation (2) can be used to estimate the elements of the matrix V using the least squares method.

It should be understood that the exact values used in these calibration images are not important, given that the display color values themselves are not used in the computation of matrix V. It should also be noted that the above calibration is not being used to find derivatives (i.e., the differences in the display colors can be large and arbitrary). In fact, with the presence of noise, the greater these differences, the more accurate the computed matrix elements are expected to be.

Figure 10:
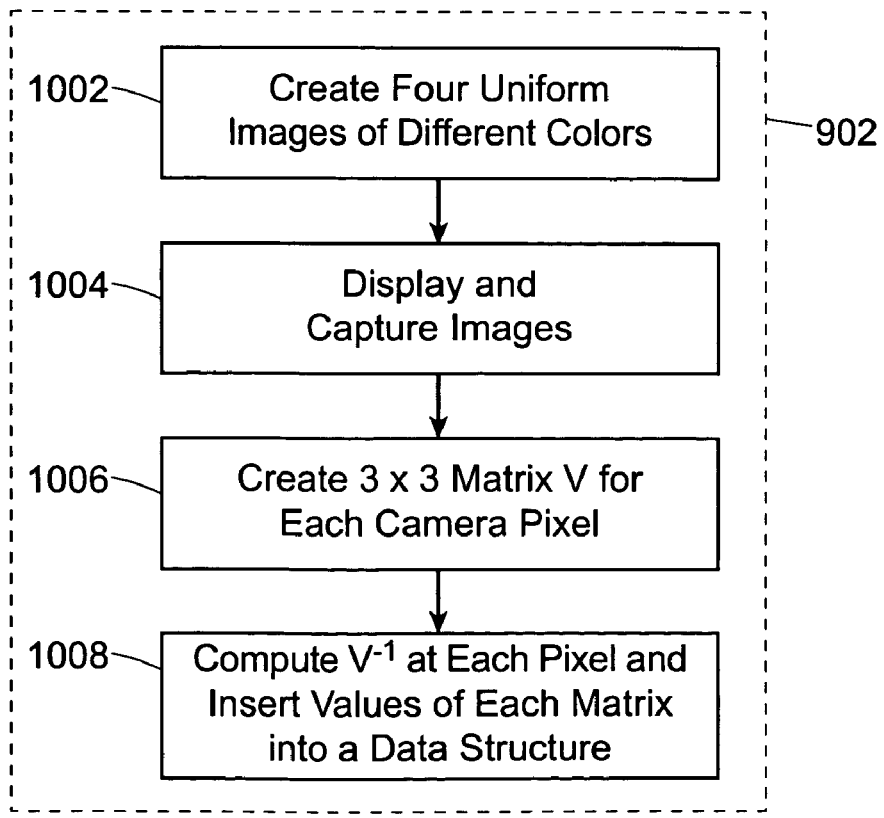
FIG. 10 is a more detailed flow chart illustrating the steps performed for the first step of the flow chart shown in FIG. 9 according to one embodiment of the present invention.

FIG. 10 is a more detailed flow chart illustrating the steps performed for computing the V matrix for the color mixing case (step 902 of FIG. 9) according to one embodiment of the present invention. In general, steps 1002-1008 described below are used to compute 3×3 matrices (at each camera pixel) that indicate the extent of color mixing between each of the projector and camera color channels.

At step 1002 of the flow chart shown in FIG. 10, four uniform images of different colors are created. For example, these four images have the following intensities in R, G, B: (0,0,0), (150,0,0), (0,150,0), and (0,0,150). Next, at step 1004, these four images are displayed and captured. In various embodiments of the present invention, 100 frames, for example, are averaged for each image in order to eliminate or at least substantially reduce camera noise. Let the captured images be called: $I_0$, $I_r$, $I_g$, and $I_b$.

Next, at step 1006, a 3×3 matrix V is created for each camera pixel, where the elements are computed as follows:

V[1][1]=V[2][2]=V[3][3]=1.0
V[1][2]=($I_g$(red)−$I_0$(red))/($I_g$(green)−$I_0$(green))
V[1][3]=($I_b$(red)−$I_0$(red))/($I_b$(blue)−$I_0$(blue))
V[2][1]=($I_r$(green)−$I_0$(green))/($I_r$(red)−$I_0$(red))
V[2][3]=($I_b$(green)−$I_0$(green))/($I_b$(blue)−$I_0$(blue))
V[3][1]=($I_r$(blue)−$I_0$(blue))/($I_r$(red)−$I_0$(red))
V[3][2]=($I_g$(blue)−$I_0$(blue))/($I_g$(green)−$I_0$(green))

Once a matrix V has been created for each pixel, $V^{-1}$ is computed at step 1008. This computation is made by setting up a linear equation B=Vx, where V is the color mixing matrix and B is a "dummy" matrix. Gauss-Jordan elimination, for example, is then used to solve this equation in order to obtain the value of $V^{-1}$. Also at step 1008, the values of $V^{-1}$ are inserted into a data structure indexed by camera pixel.

Once the matrix V has been computed as described above, any measured color M can be mapped to the camera color C (using the camera calibration results), whereby the result is multiplied with the inverse of V to obtain the projector color P. The projector colors are related to the display image color as follows: $P_R=g_R(I_R)$, $P_G=g_G(I_G)$, and $P_B=g_B(I_B)$, where $g_K=p_K d_K$ are the composite non-linear radiometric responses of the projection system. It should be noted that these responses, and their inverses, can then be computed using the same procedure described above in connection with the gray world and independent color channel cases.

Figure 11:
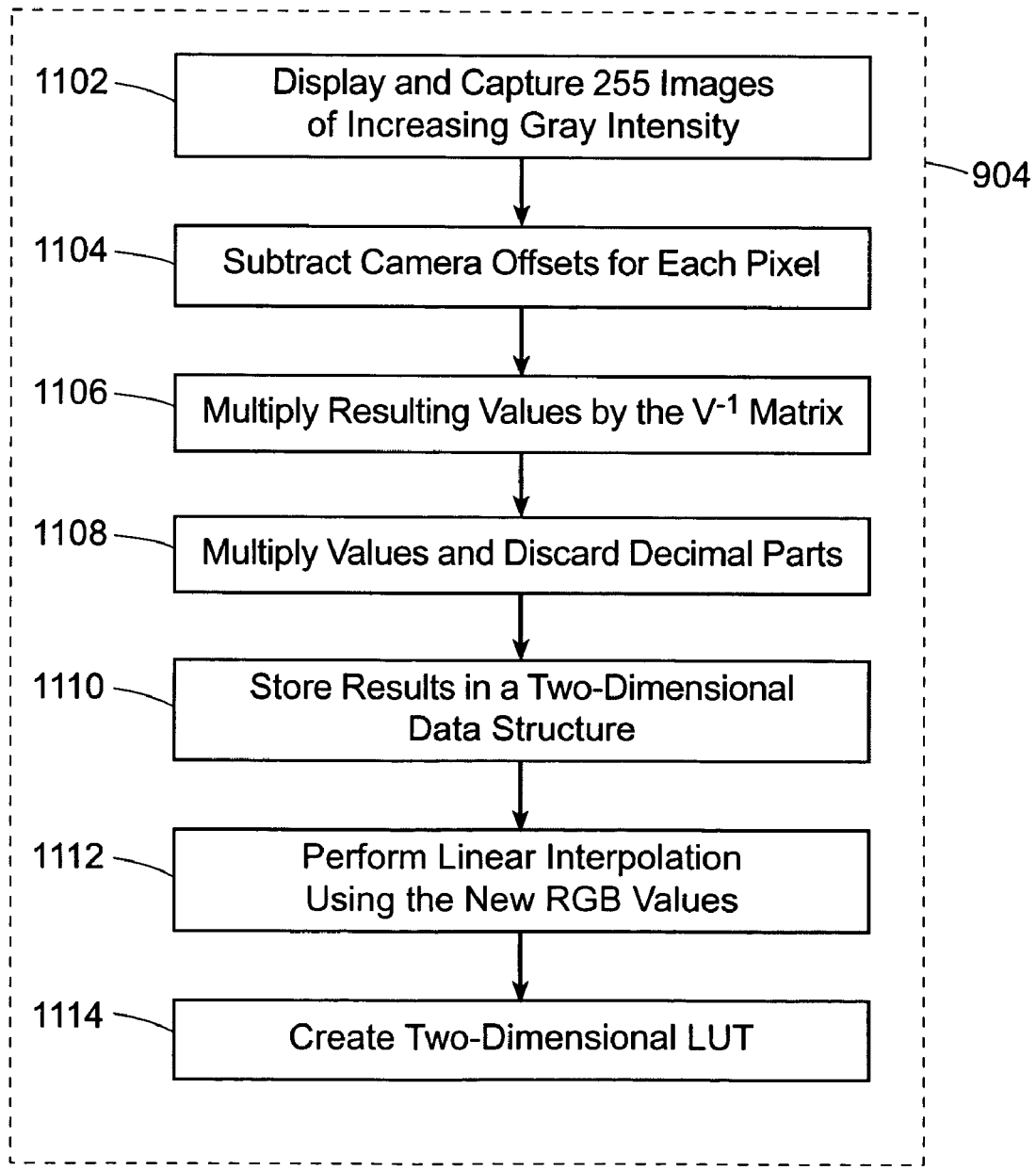
FIG. 11 is a more detailed flow chart illustrating the steps performed for the second step of the flow chart shown in FIG. 9 according to one embodiment of the present invention.

FIG. 11 is a more detailed flow chart illustrating the steps performed in the color mixing case for determining the non-linear responses of projector 102 at each pixel (step 904 of FIG. 9) according to one embodiment of the present invention. It should be noted, however, that the present invention is not limited to embodiments in which the non-linear response for each pixel (and each channel) is determined.

At step 1102, 255 images of increasing gray intensity are displayed and captured, such that each of the images are gray, and within each image, the gray level is substantially uniform. In various embodiments of the present invention, 100 frames, for example, are averaged in order to eliminate or at least substantially reduce camera noise. Next, at step 1104, the value of the red, green, and blue camera offsets are subtracted from the color values at each pixel of every image being captured. It will be understood that subtracting the camera offsets is intended to compensate for the fact that the pixel values of camera 108 can be affected by electronics of camera 108, temperature variations (which may cause camera 108 to confuse thermal radiation for photons), and other factors. For example, it is known in the art that, even in the case where the lens of camera 108 is covered by a lens cap, the captured image by camera 108 will not always be (0,0,0) as might be anticipated. Rather, there will generally be some red, green, and blue color values which need to be accounted for.

In step 1106, the resulting values from step 1104 are multiplied by the $V^{-1}$ matrix for each pixel of each image, resulting in a new RGB triplet (RGB') for each pixel. Moreover, because some values may be negative, a fixed offset (e.g., 145) is added to ensure that all values are positive. Next, at step 1108, all values are multiplied by ten and any non-integer components are discarded. In this manner, one decimal point precision is effectively retained, although it is not necessary to store 64 bit values in memory as is generally required to store a floating point decimal. The results may then be stored in a two-dimensional data structure (step 1110), where each row represents a camera pixel. It will be understood that each row will have 255 entries, where each entry is the RGB' value for a pixel at a given calibration image.

In step 1112, linear interpolation is performed using the new RGB' values obtained from the preceding steps to find the RGB' values at the floating point camera locations. For each projector pixel, the geometric mapping is used to find the corresponding floating point camera location. Next, the four neighboring camera pixels (non-floating point, actual pixels) are determined and their RGB' values are used to interpolate the RGB' values at the floating point coordinate. Monotonicity is also enforced on these interpolated values. The 255 interpolates values are then scanned to determine whether there is any position i for which the value is less than at position i−1. If there is, for each such position, the next position j for which the value is greater than position i−1 is found, and the values of all positions between i−1 and j are increased such that they form a substantially straight line.

Finally, for each projector pixel, the interpolated, monotonized RGB' values are used to evaluate what the displayed value should be in each channel to produce RGB' values of 0-255 (step 1114). For example, in order to observe a value of 100 in the red channel, linear interpolation is used in connection with the bounding values of 100 (from the data determined as described above) in order to determine the value that should be displayed. These resulting values are inserted into a two-dimensional data structure look-up table that is indexed by projector pixel. Each entry may be an array of length 255, where each element in the array may be indexed to determine what output value should be displayed in order to observe a desired value.

Figure 12:
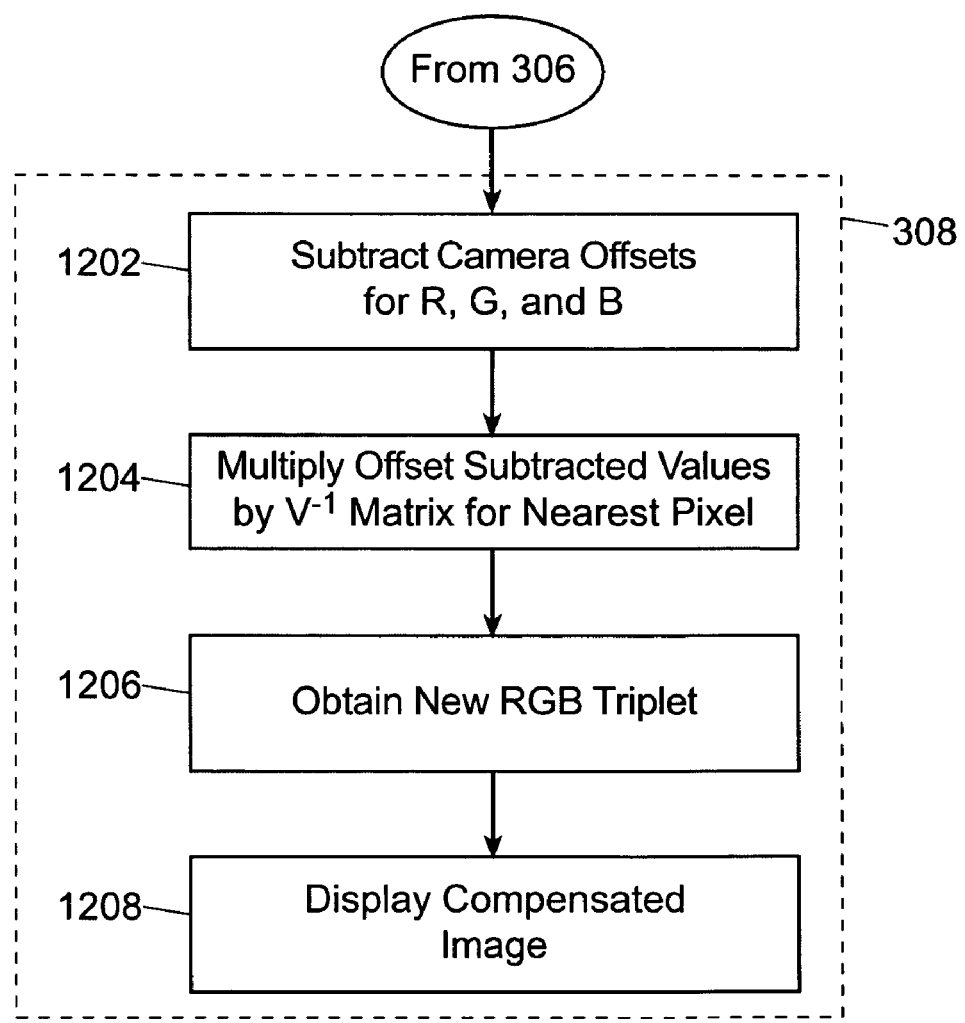
FIG. 12 is a more detailed flow chart illustrating the steps performed for the fourth step of the flow chart shown in FIG. 3 according to one embodiment of the present invention.
Figure 14B:
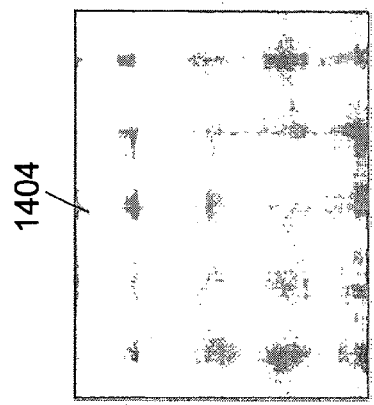
FIG. 14 is an illustration of an uncompensated output image for a flay gray image being projected onto a brick-wall surface and three iteratively compensated output images according to one embodiment of the present invention.
Figure 14D:
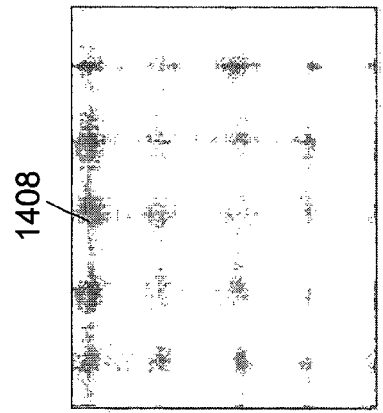
Figure 14A:
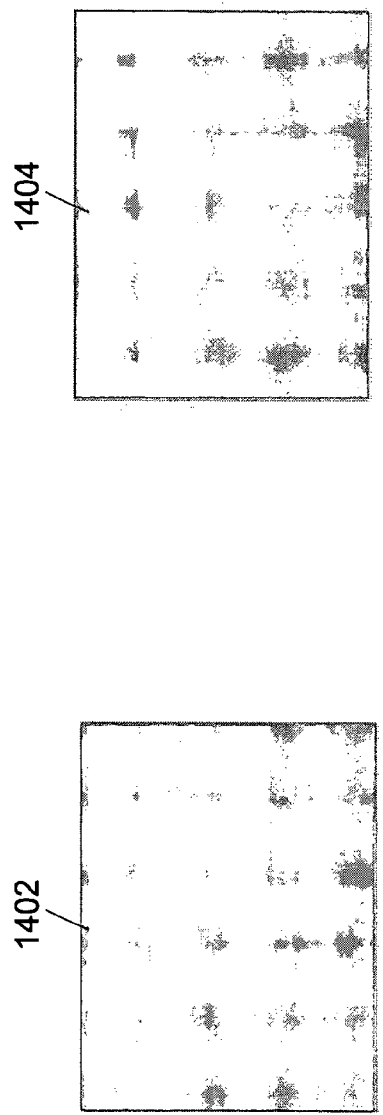
Figure 14C:
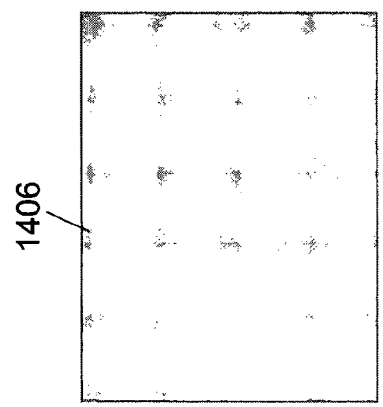

Returning to the flow chart shown in FIG. 3, the final step (step 308) in the color mixing case is now described with reference to the flow chart shown in FIG. 12. It should be noted, however, that the following description is provided for the purpose of illustration only, and not for limitation.

Once the look-up table is obtained from step 904 described above, it is possible to compensate output images by performing the following steps for each pixel in the original output image. At step 1202, the camera offsets for red, green, and blue are subtracted from the color values at each pixel. Next, at step 1204, the resultant values from step 1202 are multiplied by the $V^{-1}$ matrix for the nearest pixel. The nearest pixel is obtained by rounding, or dropping the decimal values of, the floating point x and y camera coordinates obtained by indexing the geometric mapping data structure with the current projector (output image) pixel coordinates. The resulting red, green, and blue values are used to index the look-up table separately.

In step 1206, we end up with a new RGB triplet for each pixel that represents the values that should be output in order for the camera to observe the desired values. Additionally, a new image (having a resolution of 800×600) is created, and the values at each pixel are set at this new RGB triplet. Finally, at step 1208, the flow chart shown in FIG. 12 ends with the display of this compensated image.

Closed-Loop Algorithm

The compensation methods described above are each based on an open-loop system, where a comprehensive radiometric model is established that enables system 100 to pre-compensate display images 202 prior to being displayed onto surface 104. As will be understood by those skilled in the art, these compensation methods benefit from the fact that only a single, efficient calibration may be required. Moreover, these methods are well suited to handle rapid compensation for a large number of display images (as may be necessary, for example, in the case of video projection).

For various applications, however, it may only be necessary to compensate for one or a few images (e.g., advertisements on a billboard). For such applications, system 100 can generally afford to take a few cycles (display and capture) to compensate for imperfections in surface 104. Accordingly, a simple closed-loop compensation algorithm according to the principles of the present invention is now described, where the appearance of surface 104 is repeatedly measured by camera 108, and these measurements are used to compensate the displayed images. It should be noted that, although geometric mapping is not described below in connection with the closed-loop embodiments of the invention, such mapping is generally required as in the case of the open-loop embodiments described above. It will be understood that, where necessary, the geometric mapping between projector 102 and camera 108 can be determined in the same manner as described above. Additionally, it will be understood that such a determination may not be necessary when, for example, the geometric mapping has already been fixed or determined in the factory.

Assuming I(t) is the original display image to be displayed at time t and M(t) is the corresponding measured image, the compensated display image for time t+1 can be computed as:

$$\tilde{I}(t+1) = \tilde{I}(t) + \alpha(I(t) - M(t)), \quad (3)$$

where $\tilde{I}(0) = I(0)$ and $\alpha$ (the gain used for the compensation) is between zero and one. It will be understood that this gain, $\alpha$, determines how aggressive the compensation is, and thus must be chosen carefully because a small value will slow the response of system 100 while a very high value may cause over-compensation (and hence oscillations).

FIG. 13 is a flow chart illustrating various steps performed by components of system 100 in connection with one embodiment of a closed-loop compensation algorithm according to the present invention. In step 1302, display image 202 which is to be compensated according to the invention is projected onto surface 104. The image of surface 104 with the image being displayed on it is then captured by camera 108 according to step 1304. It may be necessary to use floating point camera locations and interpolate between the pixels of camera 108 as described above to make points in the camera image correspond with points in the projector image.

Next, at step 1306, it is determined whether the difference between display image 202 and measured image 216 is within a predetermined tolerance level. It will be understood that any suitable criteria may be used in making this determination, and that the invention is not limited in this manner. If this difference is within the determined tolerance level, the feedback compensation algorithm is completed. Assuming this difference is not within the tolerance level (which will generally be the case in the first iteration of the algorithm), the algorithm proceeds to step 1308.

At step 1308, the compensated display image for this particular iteration is computed. This computation is performed, for example, using equation (3). Accordingly, for each projector pixel, the difference between the original image and the measured image (which for the first iteration is a completely uncompensated image) is determined. This difference is then multiplied by the gain factor, $\alpha$, and this value is added to the value of the image that was displayed in the previous iteration (or to the original image in the first iteration). This computed compensation image is then displayed at step 1310, and captured at step 1312. Finally, following the capture of the compensated display image at step 1312, the algorithm returns to step 1306 to once again determine whether the difference between the original image and the measured (current compensated) image is within the tolerance level. Steps 1308-1312 may then be repeated until this difference is within the tolerance level, or some other stopping point has been reached.

FIG. 14 is an illustration of an uncompensated output image 1402 for a flat gray image being projected onto a brick-wall surface and three iteratively compensated output images 1404, 1406, and 1408 according to one embodiment of the present invention. The uncompensated output image 1402 (iteration=0) is shown on the far left of FIG. 14. The subsequent images 1404, 1406, and 1408 are output images corresponding to some of the iterations performed according to the principles of the present invention described above. As demonstrated by the images of FIG. 14, the continuous feedback algorithm converges to the desired result after a few frames (iterations).

It should be noted that the continuous feedback algorithm has disadvantages compared to the radiometric model based algorithms described above because the compensation must be an iterative one. As such, there exists the possibility that the input to the system can itself change (consider the display of a video) before the desired image has been projected onto surface 104. In this case, the compensation results can have large errors (and thus artifacts), particularly around discontinuities either on surface 104 or the displayed image. Nevertheless, if the projector-camera system can be run at a sufficient rate (e.g., higher than 30 fps), the compensation can be fast enough for the observer not to notice many (or any) artifacts.

Moreover, it should be understood that the continuous feedback algorithm also has several advantages over the compensation algorithms described above which are based on a radiometric model. For example, the continuous feedback algorithm does not require an off-line radiometric calibration. Additionally, for example, the continuous feedback algorithm can adjust for changes in the properties of the surface over time, while the radiometric model compensation algorithms must repeat the calibration process following each change.

Due to the benefits and potential drawbacks described above, it may be desirable to combine the continuous feedback algorithm with one of the open-loop model based algorithms described above. For example, the radiometric method can be used to pre-compensate display images, such that the displayed images appear very close to that which is desired, while the feedback algorithm is used to "refine" this output. In this manner, fine adjustments can be made to the pre-compensated display images in order to achieve higher precision in the compensation. Moreover, because the adjustments are expected to be small in this case, the convergence time of the feedback algorithm becomes less critical.

The feedback algorithm can be also be used in various embodiments of the present invention for "learn-as-you-go" compensation. In particular, a compensation map, corresponding to a compensated color for a given input display color for each pixel, can be learned using the feedback algorithm. For example, assume a user of system 100 is giving a presentation, and is projecting multiple images onto surface 104. In this case, for each of these images, the feedback algorithm is used as described above to iteratively compensate for the surface's imperfections. Once the compensation is complete for each image, the resulting compensation map for one projected color at each pixel can be stored (e.g., in computer 110). As the presentation proceeds, more colors are projected and the map begins to become densely populated. Once a sufficient number display images have been shown to the system (and compensated for), a dense compensation map will be available. While it is possible that this map will have "holes" in it, these holes can be filled in by applying standard interpolation methods to the discrete points of the map. In other situations, meanwhile, a pre-selected set of images (rather than the user's presentation images) can be used to arrive at this compensation map. It will be understood that, in this case, the input images can be chosen to sample the color space in a more efficient manner.

Although the present invention has been described and illustrated in the foregoing illustrative embodiments, it is understood that the present disclosure has been made only by way of example, and that numerous changes in the details of implementation of the invention may be made without departing from the spirit and scope of the invention. For example, although the display of still images has been described above, it will be understood that the present invention is also applicable to the display of videos, where one or more of the video frames are compensated according to the invention. The present invention is limited only by the claims which follow.

What is claimed is:

1. A method for projecting a display image using a projector to form a projected image on a surface, the method comprising:

performing radiometric calibration based on a radiometric model using a camera, wherein the radiometric model takes into account effects of at least one color channel of the projector and the camera upon one or more different color channels of the projector and the camera and wherein the performing the radiometric calibration further comprises computing non-linear responses of the projector and the camera by projecting first images having increasing gray intensity, capturing the projected first images as measured images, and multiplying color values in the measured images by the inverse of a color mixing matrix;

compensating the display image to form a compensated display image based on the radiometric calibration; and projecting the compensated display image onto the surface.

2. The method of claim 1, wherein the performing radiometric calibration comprises calculating entries for the color mixing matrix.

3. The method of claim 2, wherein the calculating comprises:

projecting first images having different colors;
capturing the projected images as measured images; and
calculating the entries for the color mixing matrix based on the measured images.

4. The method of claim 1, wherein the radiometric model describes a elationship between the brightness in display images and the brightness in measured images.

5. The method of claim 1, wherein the radiometric model comprises the color mixing matrix.

6. The method of claim 1, further comprising determining a geometric mapping between a projector used to project the compensated display image and a camera used to capture the projected compensated display image as a measured image.

7. The method of claim 6, wherein the determining comprises using a piecewise polynomial model to establish a correspondence between points in the compensated display image and points in the measured image.

8. The method of claim 6, wherein the determining comprises:

creating a plurality of first images;
projecting the plurality of first images;
capturing the projected first images as measured first images; and
mapping points in the first images to points in the measured first images.

9. The method of claim 6, wherein the geometric mapping is predetermined at the time of manufacture of the projector and the camera.

10. The method of claim 9, wherein the optics of the projector and the camera are coaxial.

11. The method of claim 1, further comprising:

capturing the compensated display image as a second measured image;
comparing the second measured image with the display image;
compensating the compensated display image to form a second compensated display image based on the comparison between the second measured image and the display image; and
projecting the second compensated display image.

12. The method of claim 11, further comprising repeatedly performing the capturing, the comparing, the compensating, and the projecting of the second compensated display image until the second measured image is within a tolerance of the display image.

13. The method of claim 1, wherein the display image is a still image.

14. The method of claim 13, wherein the display image is an advertisement.

15. The method of claim 1, wherein the display image is a video frame.

16. A system for projecting a first image to form a projected first image on a surface, the system comprising:

a projector that projects display images to form projected images on the surface;
a camera that captures the projected images as measured images; and
a processor coupled to the projector and the camera that performs radiometric calibration based on a radiometric model using measured images, that compensates the first image to form a compensated first image based on the radiometric calibration, and that provides the compensated first image to the projector for projection onto the surface,
wherein the radiometric model takes into account effects of at least one color channel of the projector and the camera upon one or more different color channels of the projector and the camera, and wherein the processor, in performing the radiometric calibration, computes the non-linear responses of the projector and the camera by causing the display images having increasing gray intensity to be projected, causing the projected display images to be captured as measured images, and multiplying color values in the measured images by the inverse of a color mixing matrix.

17. The system of claim 16, wherein the radiometric model describes a relationship between the brightness in display images and the brightness in measured images.

18. The system of claim 16, wherein the radiometric model comprises the color mixing matrix.

19. The system of claim 18, wherein the processor, in performing radiometric calibration, calculates entries for the color mixing matrix.

20. The system of claim 19, wherein the processor, in calculating, causes display images having different colors to be projected, causes the projected display images to be captured as measured images, and calculates the entries for the color mixing matrix based on the measured images.

21. The system of claim 16, wherein the processor also determines a geometric mapping between the projector and the camera.

22. The system of claim 21, wherein the processor, in determining, uses a piecewise polynomial model to establish a correspondence between points in the compensated display image and points in the measured image.

23. The system of claim 21, wherein the processor, in determining, creates a plurality of second images, causes the plurality of second images to be projected, causes the projected second images to be captured as measured second images, and maps points in the second images to points in the measured second images.

24. The system of claim 16, wherein a geometric mapping between the projector and the camera is predetermined at the time of manufacture of the projector and the camera.

25. The method of claim 24, wherein the optics of the projector and the camera are coaxial.

26. The system of claim 16, wherein the processor also causes the projected compensated display image to be captured as a second measured image, compares the second measured image with the display image, compensates the compensated display image to form a second compensated display image based on the comparison between the second measured image and the display image, and causes the second compensated display image to be projected.

27. The system of claim 26, wherein the processor also repeatedly causes the projected compensated display image to be captured, compares the second measured image with the display image, compensates the compensated display image, and causes the second compensated display image to be projected until the second measured image is within a tolerance of the display image.

* * * * *